(12) United States Patent
Takano et al.

(10) Patent No.: US 10,663,676 B2
(45) Date of Patent: *May 26, 2020

(54) ADJUSTABLE POLARITY FIBER OPTIC CONNECTOR ASSEMBLIES WITH PUSH-PULL TABS

(71) Applicant: Senko Advanced Components, Inc., Marlborough, MA (US)

(72) Inventors: Kazuyoshi Takano, Southborough, MA (US); Jimmy Jun-Fu Chang, Worcester, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,629

(22) Filed: Nov. 21, 2017

(65) Prior Publication Data

US 2018/0341069 A1 Nov. 29, 2018

Related U.S. Application Data

(60) Provisional application No. 62/511,303, filed on May 25, 2017.

(51) Int. Cl.
*G02B 6/36* (2006.01)
*G02B 6/38* (2006.01)

(52) U.S. Cl.
CPC .......... *G02B 6/3879* (2013.01); *G02B 6/3826* (2013.01); *G02B 6/3857* (2013.01)

(58) Field of Classification Search
CPC .............................. G02B 6/3879; G02B 6/3826
See application file for complete search history.

(56) References Cited

U.S. PATENT DOCUMENTS 6,017,153 A * 1/2000 Carlisle ................ G02B 6/3821
385/56
6,174,190 B1 1/2001 Tharp et al.
(Continued)

FOREIGN PATENT DOCUMENTS

CN 102016670 A 4/2011
CN 103529522 A 1/2014
(Continued)

OTHER PUBLICATIONS

PCT/US2018/034658 International Search Report dated Oct. 16, 2018.
PCY/US2018/034658 Written Opinion dated Oct. 16, 2018.

*Primary Examiner* — Ellen E Kim
(74) *Attorney, Agent, or Firm* — Edward S. Jarmolowicz, Esq.

(57) ABSTRACT

Connector assemblies are described herein. For example, a connector assembly including: a housing configured to accept a first ferrule and a second ferrule. The connector assembly may also have a latch component that is removably connected to the housing, wherein the latch component is configured to rotate around the housing. The latch component may have a first locking element configured to engage a second locking element to prevent rotation of the latch component in at least one of a first polarity position to a second polarity position. The connector may further more include a push-pull tab removably connected to the housing and configured to move vertically along the housing when a biasing force is applied in at least one of a forward direction and a rearward direction. Accordingly, the push-pull tab can compress the latch component when moving vertically along the housing.

18 Claims, 33 Drawing Sheets

(56) References Cited

U.S. PATENT DOCUMENTS

| | | | |
|---|---|---|---|
| 6,364,537 B1 * | 4/2002 | Maynard | G02B 6/3831 |
| | | | 385/55 |
| 6,783,280 B2 | 8/2004 | Viklund | |
| 6,863,556 B2 | 3/2005 | Viklund et al. | |
| 7,297,013 B2 | 11/2007 | Caveney et al. | |
| 7,588,373 B1 | 9/2009 | Sato et al. | |
| 7,959,455 B1 | 7/2011 | Armstrong et al. | |
| 8,152,385 B2 * | 4/2012 | de Jong | G02B 6/3879 |
| | | | 385/53 |
| 8,221,007 B2 | 7/2012 | Peterhans et al. | |
| 8,727,638 B2 * | 5/2014 | Lee | G02B 6/3879 |
| | | | 385/139 |
| 8,864,390 B2 * | 10/2014 | Chen | G02B 6/387 |
| | | | 385/60 |
| 9,448,370 B2 * | 9/2016 | Xue | G02B 6/38 |
| 9,465,172 B2 * | 10/2016 | Shih | G02B 6/3879 |
| 9,595,786 B1 | 3/2017 | Takano et al. | |
| 9,678,283 B1 | 6/2017 | Chang et al. | |
| 10,120,140 B2 * | 11/2018 | Goldstein | G02B 6/3879 |
| 2005/0213891 A1 * | 9/2005 | Hardcastle | G02B 6/3861 |
| | | | 385/60 |
| 2013/0163934 A1 | 6/2013 | Lee | |
| 2014/0169727 A1 * | 6/2014 | Veatch | G02B 6/3831 |
| | | | 385/11 |
| 2016/0169727 A1 | 6/2016 | Riedel et al. | |
| 2016/0216458 A1 * | 7/2016 | Shih | G02B 6/3871 |
| 2016/0327756 A1 | 11/2016 | Raven et al. | |
| 2016/0327757 A1 | 11/2016 | Lee | |
| 2016/0349458 A1 * | 12/2016 | Murray | G02B 6/3825 |

FOREIGN PATENT DOCUMENTS

| | | |
|---|---|---|
| DE | 202009019167 U1 | 7/2017 |
| EP | 2274644 B1 | 4/2015 |
| EP | 2664951 B1 | 6/2016 |
| EP | 3101456 A1 | 12/2016 |
| WO | 2009135787 A1 | 11/2009 |

* cited by examiner

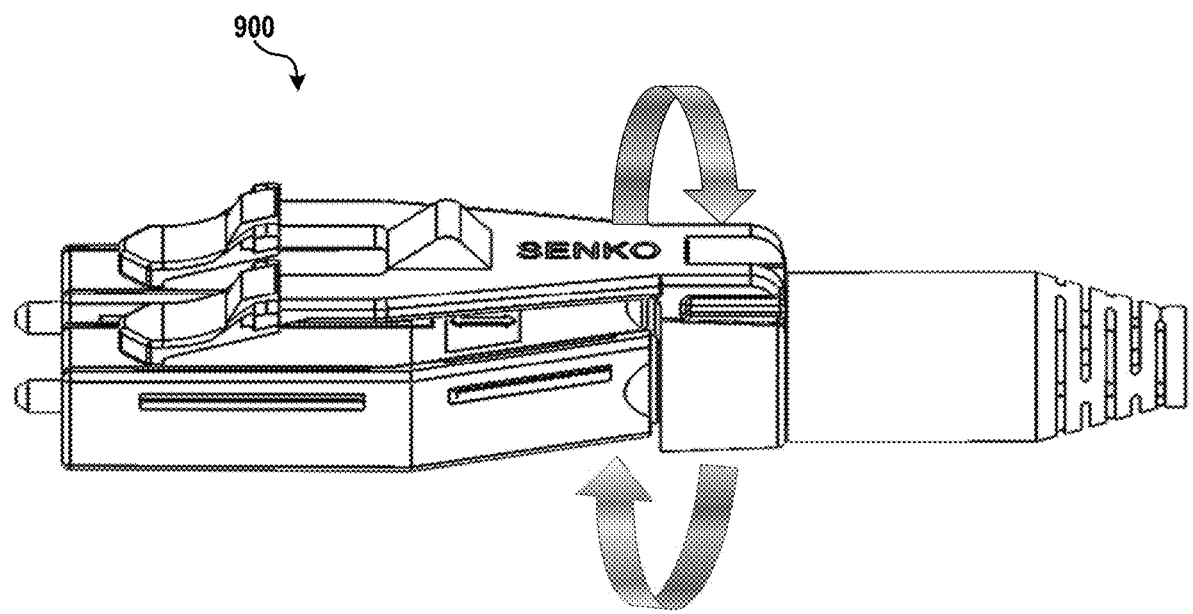
FIG. 9A
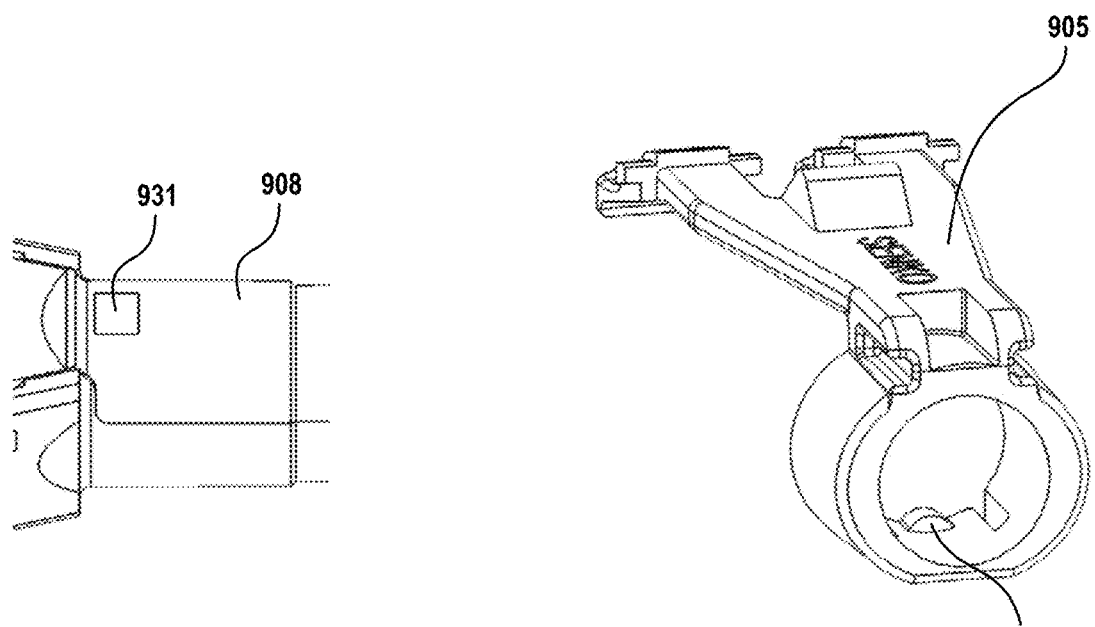
FIG. 9B
FIG. 9C

//ADJUSTABLE POLARITY FIBER OPTIC CONNECTOR ASSEMBLIES WITH PUSH-PULL TABS

CROSS-REFERENCED TO RELATED APPLICATIONS

The present application claims benefit of priority under 35 U.S.C. 119(e) to the filing date of U.S. Provisional Patent Application 62/511,303 filed May 25, 2017, entitled, "CLIP ON PUSH/PULL TAB," the contents of which are incorporated herein by reference in their entirety.

BACKGROUND

The present disclosure relates generally to fiber optic connectors. The prevalence of the Internet has led to unprecedented growth in communication networks. Consumer demand for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

Accordingly, there is a need for fiber optic connectors that will meet the needs of future developments allowing for smaller footprints, easier implementation, and easy field modification.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a connector assembly may have a housing configured to accept a first ferrule and a second ferrule. The connector assembly may also have a latch component that is removably connected to the housing, wherein the latch component is configured to rotate around the housing. The latch component may have a first locking element configured to engage a second locking element to prevent rotation of the latch component in at least one of a first polarity position to a second polarity position. The connector may further more include a push-pull tab removably connected to the housing and configured to move vertically along the housing when a biasing force is applied, to the push-pull tab, in at least one of a forward direction and a rearward direction. Accordingly, the push-pull tab can compress the latch component when moving longitudinally along the housing.

In an embodiment, a connector assembly having an adjustable polarity may include a first plug frame and a second plug frame that are independent from each other, a first ferrule disposed within the first plug frame and a second ferrule disposed within the second plug frame that are each coupled to a terminal end of an optical fiber cable; and a housing that may include a top housing component configured to be removably coupled to a bottom housing component. The top and bottom housing coupled together to form a configured to secure the first plug frame and the second plug frame within the connector assembly. In one aspect, removal of the top housing component from the bottom housing component may provide access to the first plug frame and the second plug frame to allow for changing a location of the first plug frame and the second plug frame within the housing to change polarity of the connector assembly.

In a further embodiment, a connector assembly may have an adjustable polarity comprising: a polymer uni-body base frame comprising a plug frame portion, a body portion, and a back post portion; a top cover; and an independent latch; wherein the independent latching component is removable connected to the distal end (D) of the base frame; and wherein the independent latch component is configured to rotate substantially concentric about the base frame to change polarity of the connector assembly from a first polarity to a second polarity.

BRIEF DESCRIPTION OF THE DRAWINGS

The above and other objects of the present invention will become more readily apparent from the following detailed description taken in connection with the accompanying drawings.

FIG. 9A depicts a potential polarity change of the connector assembly according to an embodiment.

FIG. 9B depicts a recess on the housing of the connector assembly according to an embodiment.

FIG. 9C depicts a protrusion on the latching component according to an embodiment.

DETAILED DESCRIPTION

Figure 1:
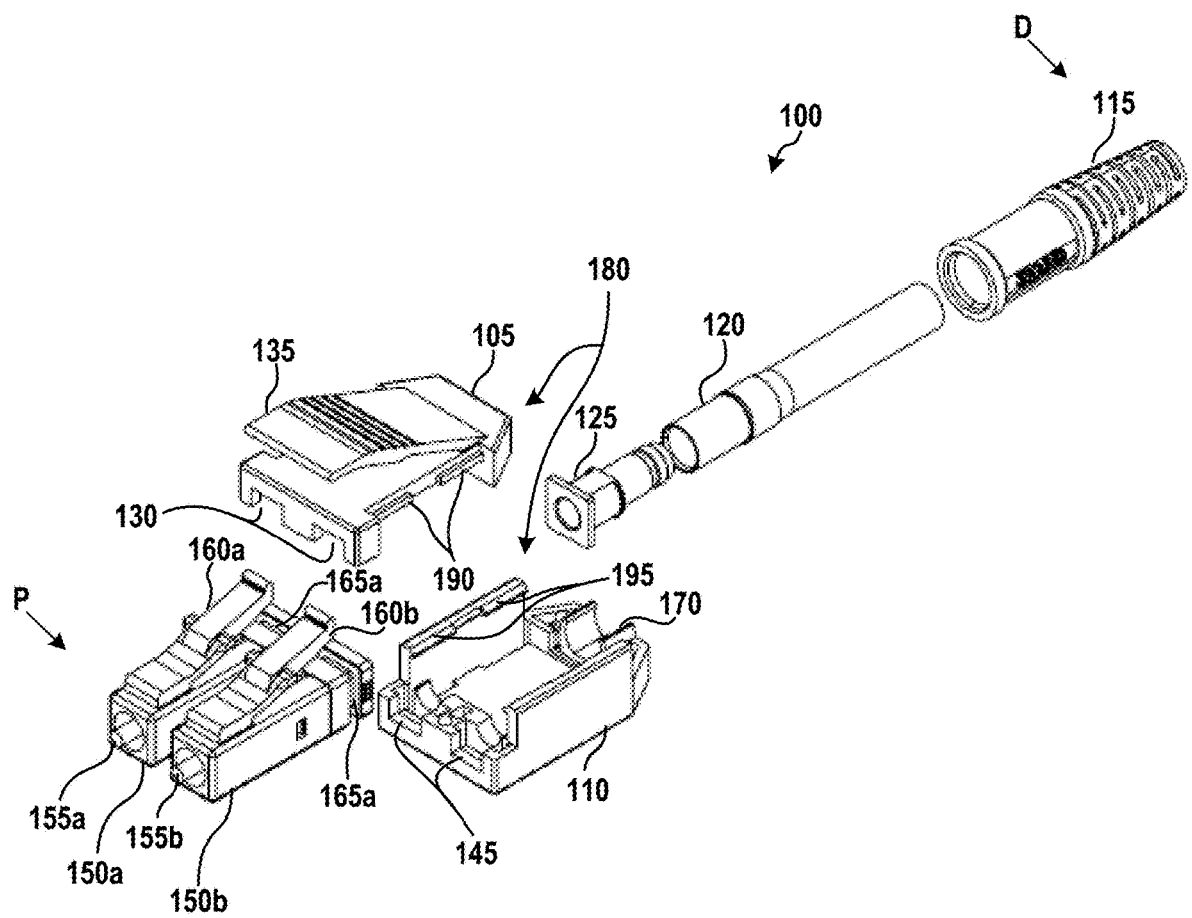
FIG. 1 depicts an exploded view of a connector assembly according to an embodiment.

The reliability of communication infrastructure depends on secure and accurate connections between components, such as cable segments, network equipment, and communication devices. Large-scale data communication systems use fiber optic cables for data transmission between components. The fiber optic cables may be terminated by connector assemblies. Duplex connector assemblies, such as an LC connector assembly, may include a receiving optical fiber (typically labeled as "A") and a transmitting optical fiber (typically labeled as "B"). Such duplex connector assemblies may connect with an adapter having corresponding receiving (or "A") and transmitting ("B") ports. A duplex connector assembly is generally configured such that the receiving optical fiber connects with the transmitting port of the adapter and the transmitting optical fiber connects with the receiving port of the adapter.

A duplex connector assembly has a polarity based on the relative orientation of the receiving optical fiber and the transmitting optical fiber. Similarly, a corresponding adapter may have a polarity based on the relative orientation of the receiving port and the transmitting port. If the polarity of the connector assembly corresponds to the polarity of the adapter, the connection between the connector assembly and the adapter may successfully communicate data over the fiber optic cables joined by these two components. However, particularly in large installations, the polarity of the connector often does not correspond with the polarity of the adapter, leading to cross over and other communication issues. The connector assembly cannot simply be rotated to a correct polarity, as the connector assembly includes elements configured to secure the connector assembly to the adapter which prevent rotation.

Conventional techniques for changing an incorrect polarity of a connector assembly involve difficult and time consuming methods. For example, an installer may be required to remove the existing, incorrect connector assembly and prepare a new connector assembly on site. Other methods involve the use of special tools or high-cost connector components that may also require twisting or rotating the fiber, which may lead to damaged connections. Accordingly, telecommunication network providers would benefit from a connector assembly configured to allow for the efficient and effective changing of the polarity of the connector assembly on-site.

The described technology generally relates to connector assemblies (for example, a plug, male connector, connector, or the like) having an adjustable polarity. In general, the connector assemblies have a plurality of orientations, alignments, or other physical attributes that cause the connector assemblies to have a plurality of polarities. In some embodiments, the connector assembly may only fit into and/or correctly connect with an adapter (for instance, a receptacle, female connector, adapter, or the like) in one or more of the polarities. The polarity of the connector assembly may be based on the relative orientation of components of the connector assembly, such as ferrules, a housing, a latch, a frame, or the like. For example, a connector assembly configured according to some embodiments may include two ferrules, a transmission ferrule and a receiving ferrule that may be arranged in one of a first polarity and a second polarity in order to form a successful connection with a corresponding adapter.

The connector assemblies and other data transmission elements described according to some embodiments herein may be connected within a network, which may include any type of network capable of transmitting signals, electricity, or any other type of transmission medium. For instance, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connector assemblies may be configured to connect cable segments and/or devices within a fiber optic network using various standard connector types and/or adaptors, including, but not limited to, LC, ST, SC, FC, DIN, D4, SMA, E2000, Biconic, FullAXS, OCD, small form-factor pluggable (SFP), WO and/or copper-type network connections, such as RJ-45 type connectors. In some embodiments, the connector assembly may include a duplex LC-type connector and the connector assembly adaptor may include an SFP adaptor. In some embodiments the connector assembly may include a LC-type uniboot connector. In some embodiments, the connector assembly may include a unibody connector, for instance, that includes a round fiber optic cable.

FIG. 1 depicts an exploded view of an illustrative connector assembly according to a first embodiment. As shown in FIG. 1, a connector assembly 100 may include a housing 180 formed from a top housing component 105 and a bottom housing component 110. The housing 180 may include a "closed" configuration when the top housing component 105 is coupled to the bottom housing component 110 and an "open" configuration when the top housing component 105 is not coupled to the bottom housing component 110. The top housing component 105 and the bottom housing component 110 may be securely coupled to each other using various means, such as a snap-fit, a friction-fit, or the like.

In some embodiments, the top housing component 105 may include one or more top projections 190 configured to engage corresponding locking projections 195 on the bottom housing component 110. As the top housing component 105 is being pushed onto the bottom housing component 110, the top projections 190 engage the locking projections 195, which may include a slanted top surface such that the force of the projections against the locking projections causes the side walls of the bottom housing component to extend outward to facilitate the movement of the projections past the locking projections and into the interior of the housing 180. When the top projections 190 have passed the locking projections 195, the side walls of the bottom housing component 110 return to their original position and the locking projections are positioned over the top projections, preventing movement of the top housing component 105 in an upward direction. Accordingly, the top housing component 105 is securely coupled to the bottom housing component 110. The top housing component 105 may be removed from the bottom housing component 110 using various processes, including prying on a portion of bottom housing component. For example, an installer may manually spread locking projections 195 apart and lift the top housing component 105 to remove the top housing component from the bottom housing component 110.

A cable (not shown) may extend through a boot 115 into the connector assembly 100. The cable may include two optical fibers (for instance, a transmitting optical fiber and a receiving optical fiber) terminating at a first ferrule 155a and a second ferrule 155b. For example, the first ferrule 155a may be coupled to a terminal end of a transmitting optical fiber and the second ferrule 155b may be coupled to a terminal end of a receiving optical fiber, or vice versa. A crimp ring and/or crimp tube 120, which may include a material, such as a heat-shrink material, may encase a portion of the cable and a crimp ring 120 may be secured to the cable. A back post 125 may engage the crimp ring 120 at a distal (D) end thereof. In some embodiments, as the crimp ring 120 is secured to the cable, the crimp ring may prevent movement of the back post 125 and, therefore, the housing 180, toward the distal (D) end of the connector assembly 100. In some embodiments, the back post 125 may be molded or otherwise affixed to a portion of the top housing component 105 or the bottom housing component 110. The back post 125 may be arranged within a channel 170 formed in the housing 180. In some embodiments, the back post 125 may be affixed to the channel 170 within the bottom housing component 110, such as through a snap-fit, a friction-fit, adhesive, or the like.

The first ferrule 155a and the second ferrule 155b may be arranged within a first plug frame 150a and a second plug frame 150b, respectively. The first plug frame 150a and the second plug frame 150b may be independent from each other. The top housing component 105 and the bottom housing component 110 may include recesses 130, 145 at a proximal (P) end thereof that are configured to engage corresponding channels 165a, 165b formed in the distal (D) end of the first plug frame 150a and the second plug frame 150b. In this manner, the first plug frame 150a and the second plug frame 150b may be secured within the connector assembly 100 when the housing 180 is in the closed configuration. In some embodiments, the first plug frame 150*a* and the second plug frame 150*b* may be coupled to the top housing component 105 and/or the bottom housing component 110 within the recesses 130, 145, such as through a snap-fit, friction-fit, or the like.

The first plug frame 150*a* and the second plug frame 150*b* may include a locking latch 160*a*, 160*b* configured to releasably couple the connector assembly 100 to a complementary adapter (not shown). The locking latches 160*a*, 160*b* may be depressable and may have sufficient flexibility such that the connector assembly 100 may be released from the adapter when the latch is activated with a moderate pressing force. The top housing component 105 may include a thumb latch 135 configured to engage the locking latches 160*a*, 160*b*. The thumb latch 135 may be positioned on the housing 180 such that individual locking latches 160*a*, 160*b* may be triggered by a single thumb latch 135 on the housing. The thumb latch 135 may be configured to depress the locking latches 160*a*, 160*b* at substantially the same time.

Figure 2A:
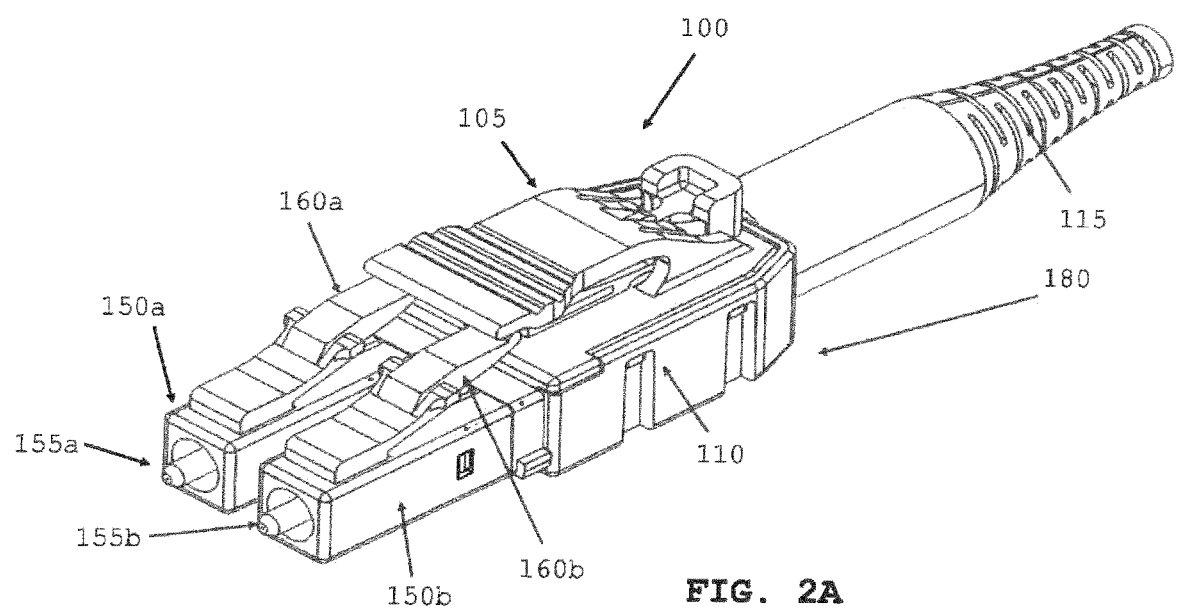
FIGS. 2A-2C depict an illustrative connector assembly according to an embodiment.
Figure 2B:
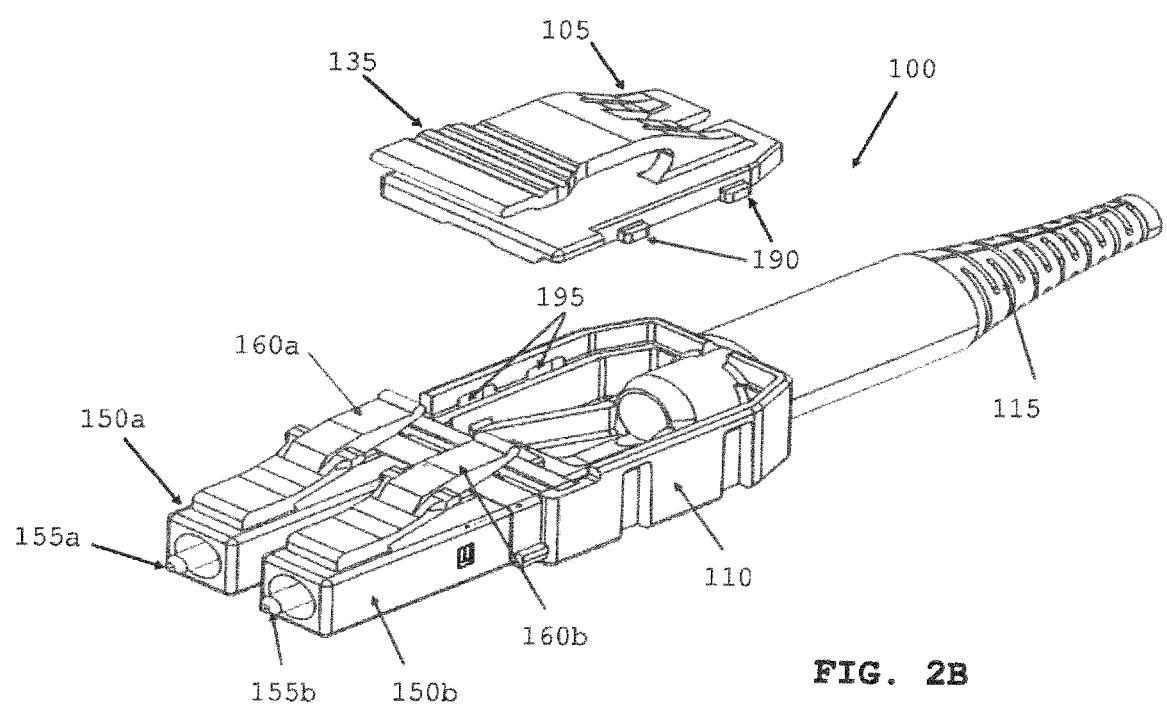
Figure 2C:
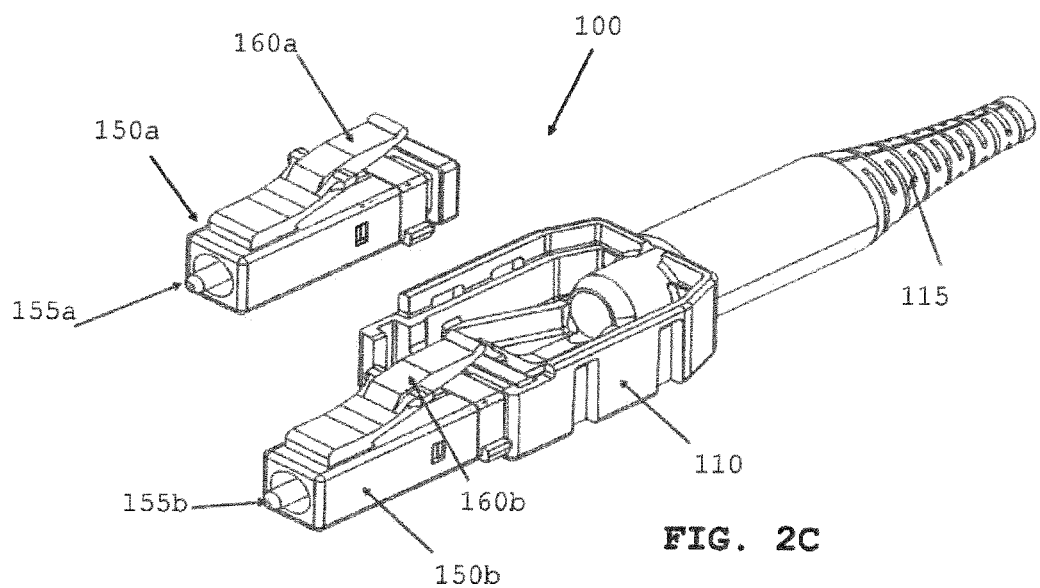

FIGS. 2A-2C depict an illustrative connector assembly according to the first embodiment. FIG. 2A depicts the connector assembly 100 with the housing 180 in the closed position and having a first polarity in which ferrule 155*a* is located on the left and ferrule 155*b* is located on the right. In FIG. 2B, the housing component 180 is in the open configuration in which the top housing component 105 has been disconnected from the bottom housing component 110 exposing the interior of the housing and allowing access to the first plug frame 150*a* and the second plug frame 150*b*. As shown in FIG. 2C, the first plug frame 150*a* and the second plug frame 150*b* may be independently moved from the bottom housing component 110 when the housing 180 is in the open configuration. Accordingly, the position of the first plug frame 150*a* and the second plug frame 150*b* and, therefore, the first ferrule 155*a* and the second ferrule 155*b*, may be switched within the connector assembly 180. In this manner, the connector assembly 100 may be adjusted to have a second polarity in which ferrule 155*a* is located on the right and ferrule 155*b* is located on the left. Once the polarity of the connector assembly 100 has been adjusted, the top housing component 105 may be coupled to the bottom housing component 110 and the connector assembly may be connected to a corresponding adapter.

Figure 3A:
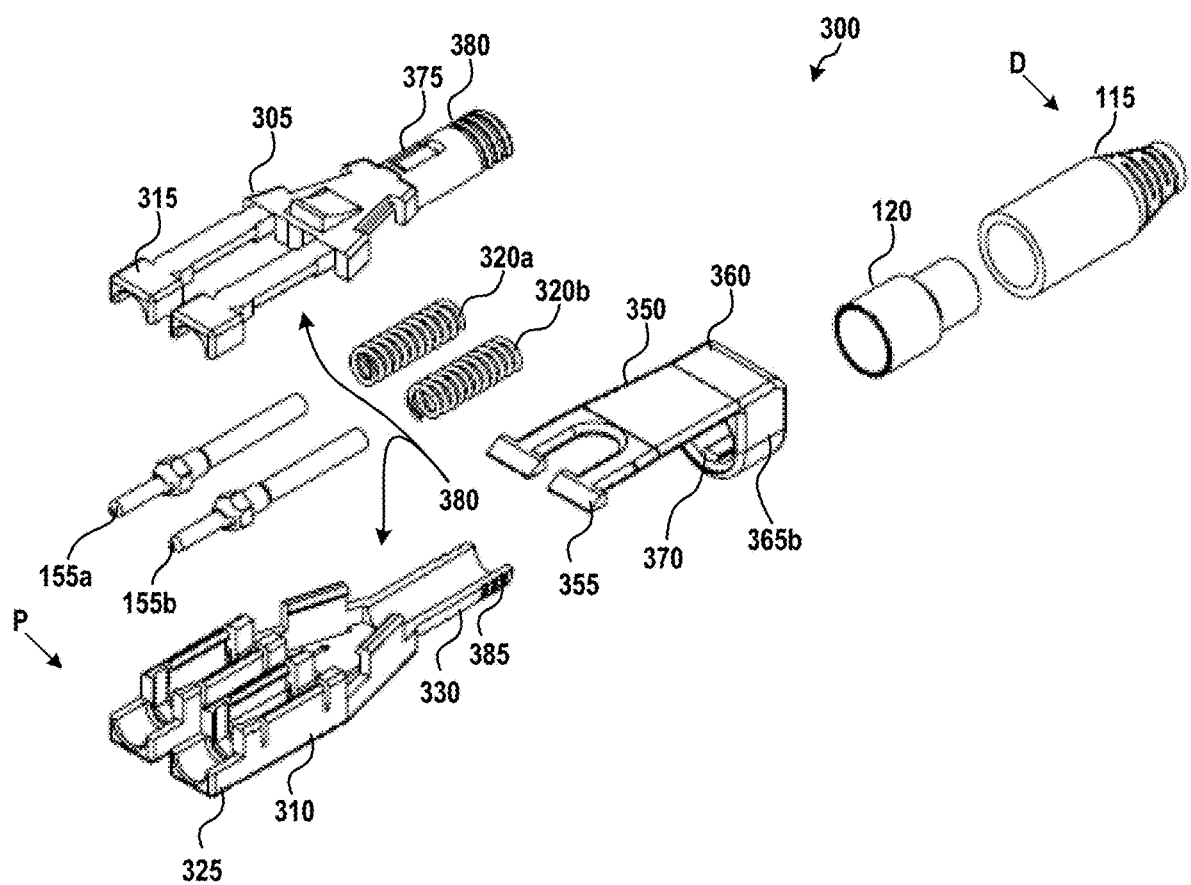
FIG. 3A depicts an exploded view of a connector assembly according to an embodiment.

FIGS. 3A-3F depict an illustrative connector assembly according to a second embodiment. In particular, FIG. 3A depicts an exploded view of an illustrative connector assembly according to the second embodiment. A connector assembly 300 may include a frame (or "housing") 380 configured to securely house a first ferrule 155*a* and a second ferrule 155*b*, springs 320*a*, 320*b*, and other internal components not shown in FIG. 3A. The frame 380 may include a top frame component 305 configured to be coupled to a bottom frame component 310, both of which may include a back post portion 381, 385 and a plug frame portion 315, 325. At least a portion of the plug frame portion 315, 325 may be configured to engage and/or be inserted into a corresponding port of an adapter. The top frame component 305 and the bottom frame component 310 may be securely coupled to each other using various means, such as a snap-fit, a friction-fit, an adhesive, or the like.

A cable (not shown) may extend through a boot 115 into the connector assembly 300. The cable may include two optical fibers (for instance, a transmitting optical fiber and a receiving optical fiber) terminating at the first ferrule 155*a* and the second ferrule 155*b*. For example, the first ferrule 155*a* may be coupled to a terminal end of a transmitting optical fiber and the second ferrule 155*b* may be coupled to a terminal end of a receiving optical fiber, or vice versa. A crimp ring 120 may be secured to the cable. The post portion 381, 385 may engage the crimp ring 120 at a distal (D) end thereof. As the crimp ring 120 is secured to the cable, the crimp ring may prevent movement of the post portion 381, 385 and, therefore, the frame 380, toward the distal (D) end of the connector assembly 300.

A latch component 350 may include a ring portion 360 arranged around a distal (D) end of the frame 380. The latch component may include a thumb latch 355 configured to releasably couple the connector assembly 300 to a complementary adapter (not shown). The thumb latch 355 may be depressable and may have sufficient flexibility such that the connector assembly 300 may be released from the adapter when the latch is activated with a moderate pressing force.

Figure 3B:
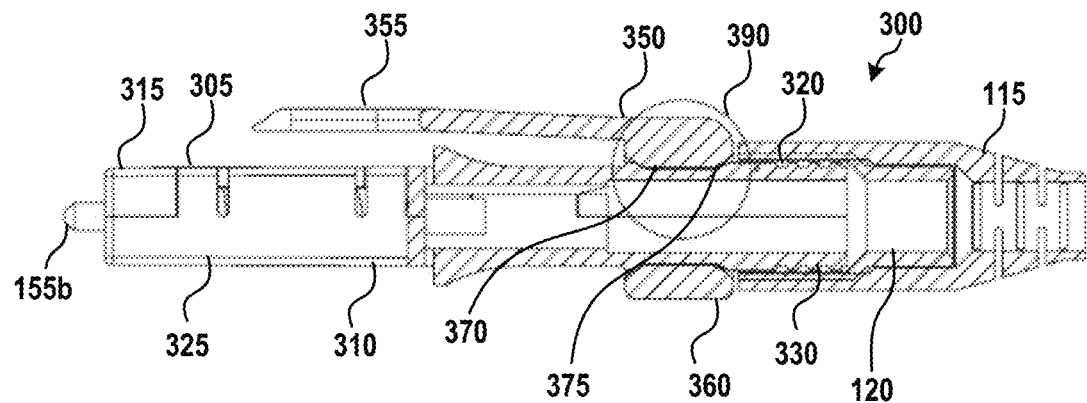
FIG. 3B depicts a cross-sectional view of a connector assembly according to an embodiment.
Figure 3C:
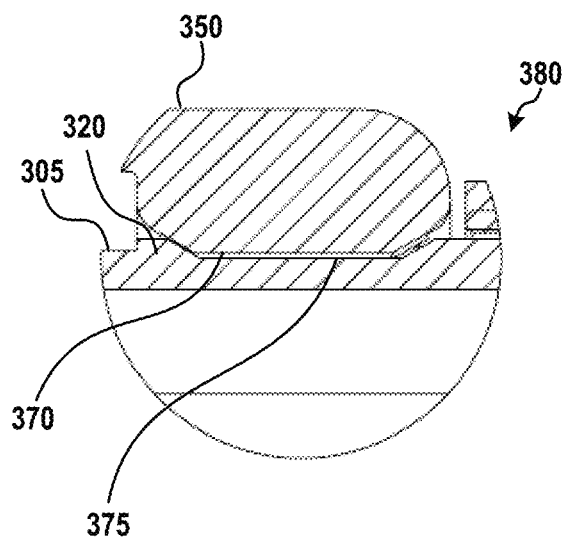
FIG. 3C depicts a detailed view of a latch component of a connector assembly according to an embodiment.

FIG. 3B depicts a cross-sectional view of the connector assembly 300 and FIG. 3C depicts detail 390 of FIG. 3B. As shown in FIGS. 3A-3C, an external surface of the frame 380 may include one or more locking recesses 375 configured to receive one or more corresponding locking projections 370 arranged on an inner surface of the ring portion 360. The latch component 350 may include one or more compression sections 365*b* (compression section 365*a* is not visible in FIG. 3A, see FIG. 3E). As shown in FIGS. 3A and 3C, the locking projections 370 may engage the locking recesses 375 to prevent the rotation of the latch component 350 with respect to the frame 380.

The compression of the compression sections 365*a*, 365*b* causes the shape of the ring portion 360 to become deformed. For example, the shape of the ring portion 360 may be integral to the latch component 350. Additionally, the ring portion 360 may have a generally circular-shape when the compression sections 365*a*, 365*b* are not compressed and a generally oval-shape when the compression sections are compressed. When the compression sections 365*a*, 365*b* are compressed, the locking projections 370 move out of the locking recesses 375 and the latch component 350 may rotate with respect to the frame 380. When the compression sections 365*a*, 365*b* are not compressed, the locking projections 370 may be inserted into the locking recesses 375 and the latch component 350 may be locked in place with respect to the frame 380. Accordingly, the latch component 350 may be rotated to the other side of the frame 380 and the connector assembly 300 may be rotated to connect with a corresponding adapter with a different polarity.

In some embodiments, sections 365*a* and 365*b* may become compressed when the user (e.g., via their fingers or a tool) twists the ring portion 360. Thus, in some embodiments, the ring portion 360 impacts sections 365*a* and 365*b* causing compression. In a further embodiment, when a user twists a ring portion 360 it becomes compressed against an integral surface (not shown) as it is rotated surface 370. If rotation continues surface 370 may engage a recess 375 thus allowing the connector to change polarity.

Figure 3D:
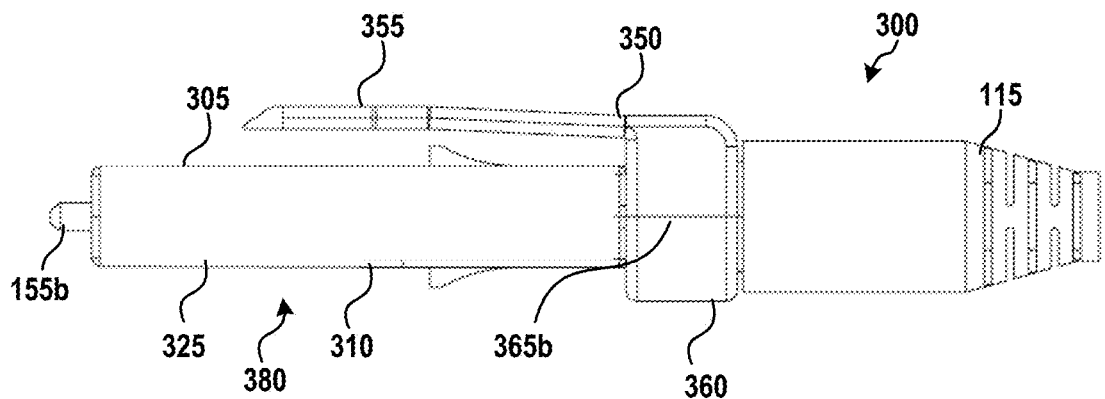
FIGS. 3D-3F depict a change in polarity of an illustrative connector assembly according to an embodiment.
Figure 3E:
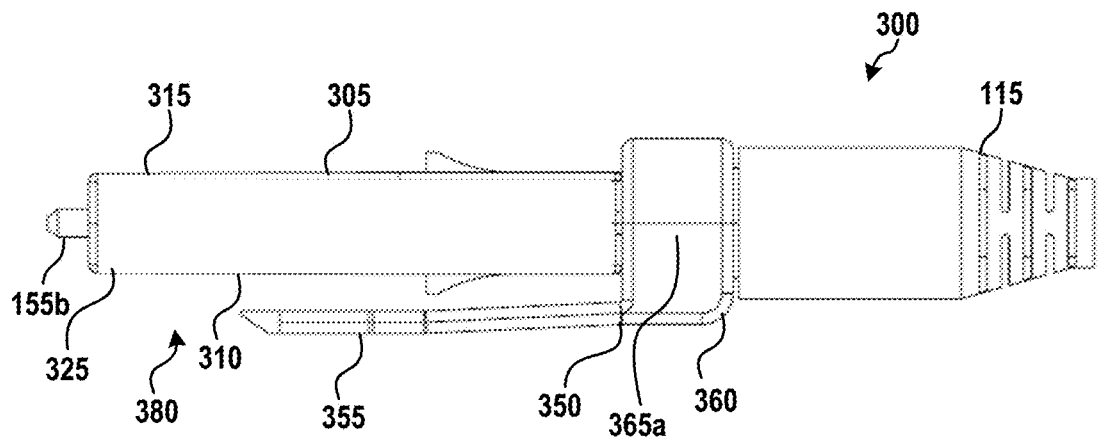
Figure 3F:
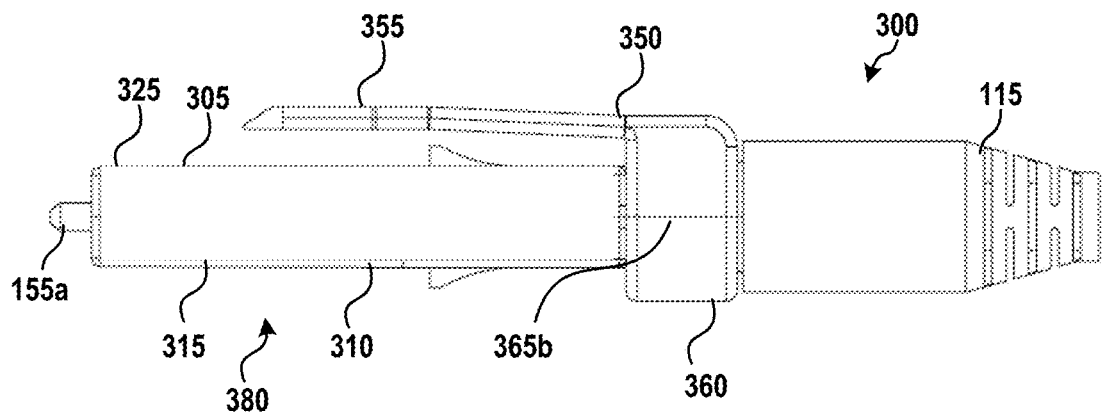

FIGS. 3D-3F depicts an illustrative polarity adjustment for the connector assembly 300. In FIG. 3D, the connector assembly 300 is arranged in a first polarity in which the connector assembly is configured to connect with an adapter with the second ferrule 155*b* on the right side and the first ferrule 155*a* on the left side of the connector assembly from a top-down perspective. The latch component 350 is arranged in a first polarity position on the frame 380, with compression section 365*b* visible in FIG. 3D and the thumb latch 355 over plug frame portion 315. In FIG. 3E, the compression sections 365*a*, 365*b* have been compressed and the latch component 350 has been rotated to a second polarity position, in which compression section 365*a* is visible in FIG. 3E and the thumb latch 355 is under plug frame portion 325. In FIG. 3F, the entire connection assembly 300 has been rotated such that the connection assembly may connect with an adapter in a second polarity with the second ferrule 155b on the left side and the first ferrule 155a on the right side of the connector assembly from a top-down perspective. Accordingly, the polarity of the connector assembly 300 may be adjusted by rotating the latch component 350 from a first polarity position to a second polarity position and rotating the connector assembly such that the thumb latch 355 is orientated to engage a corresponding adapter.

Figure 4A:
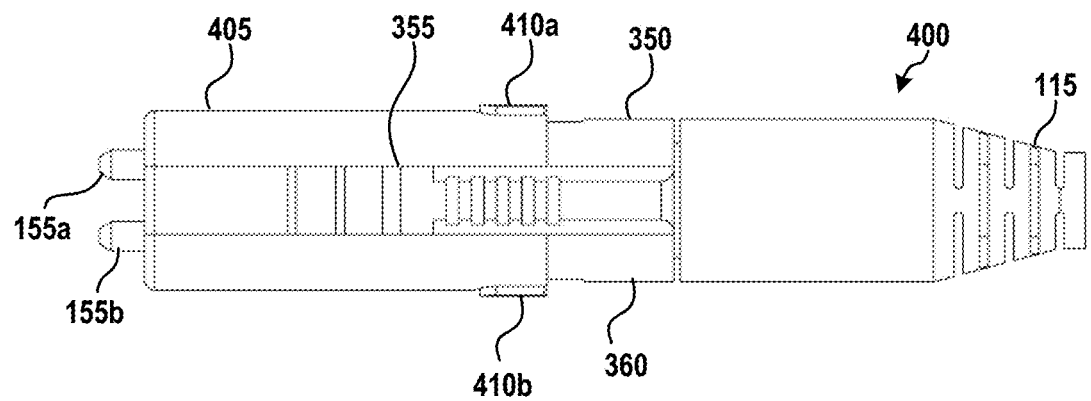
FIG. 4A depicts a top-down view of a connector assembly according to an embodiment.

FIGS. 4A-4I depicts an illustrative connector assembly according to a third embodiment. FIG. 4A depicts a top-down view of a connector assembly 400 having a housing and compression elements 410a, 410b. A latch component 350 may have a ring portion 360 disposed around a locking component 430 (not shown, see FIG. 4B). In some embodiments, the compression elements 410a, 410b may be resilient and biased outward. In some embodiments, compression of compression elements 410a, 410b may allow latch component 350 to rotate from a first polarity position to one or more other positions.

Figure 4B:
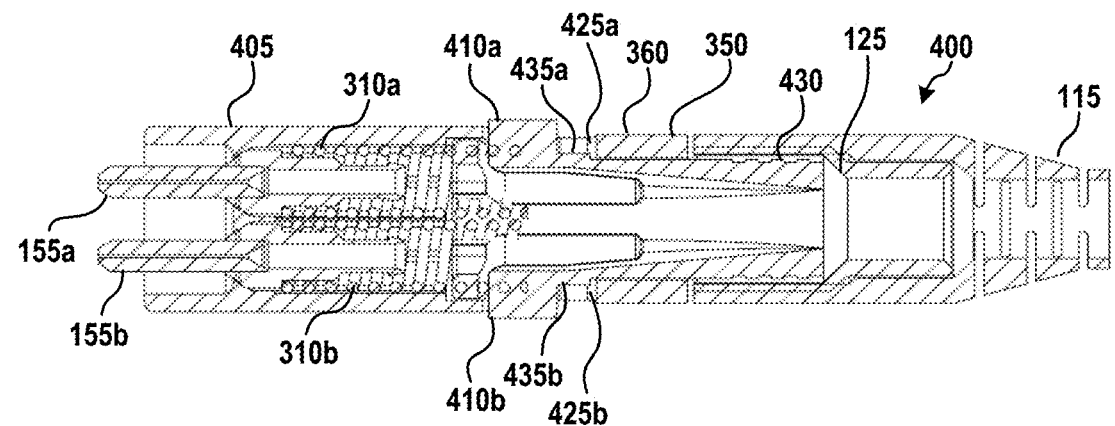
FIG. 4B depicts a cross-sectional view of a connector assembly according to an embodiment.

FIG. 4B depicts a cross-sectional view of the connector assembly 400 from a top-down perspective. As shown in FIG. 4B, the compression elements 410a, 410b may be arranged on a locking component 430. One or more cables (not shown) may extend through the connector assembly 400, for example, through the boot 115, the crimp ring 125, the locking component 430, and the housing 405, and terminating at the ferrules 155a, 155b. When the compression elements 410a, 410b are not compressed, locking elements 435a, 435b arranged on the locking component 430 may engage the latch component 350 to prevent rotation thereof. In some embodiments, the locking elements 435a, 435b may engage a locking recess 425a, 425b formed in the ring portion 360 of the latch component 350. Compression of the compression elements 410a, 410b may cause the locking elements 435a, 435b to move inward such that they no longer engage the latch component 350, thereby allowing the latch component to rotate about the locking component 430. As the latch component 350 rotates around the locking component 430, the outward bias of the locking elements 435a, 435b may cause the locking components to press against the inner surface of the ring portion 360. Accordingly, when a locking recess 425a, 425b is located over a locking element 435a, 435b without the compression elements 410a, 410b being compressed, the locking element may push outward and re-engage the locking recess 425a, 425b.

Figure 4C:
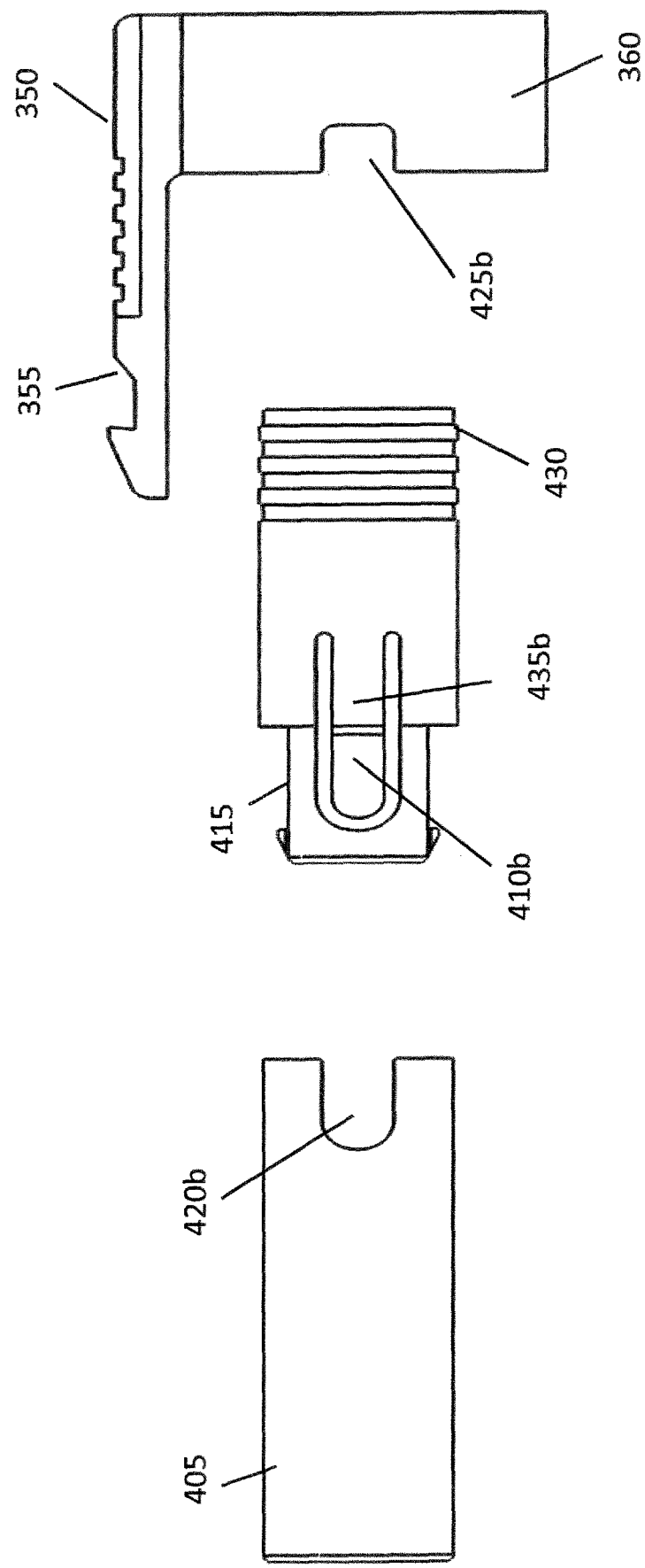
FIG. 4C depicts a side view of a connector assembly according to an embodiment.
Figure 4D:
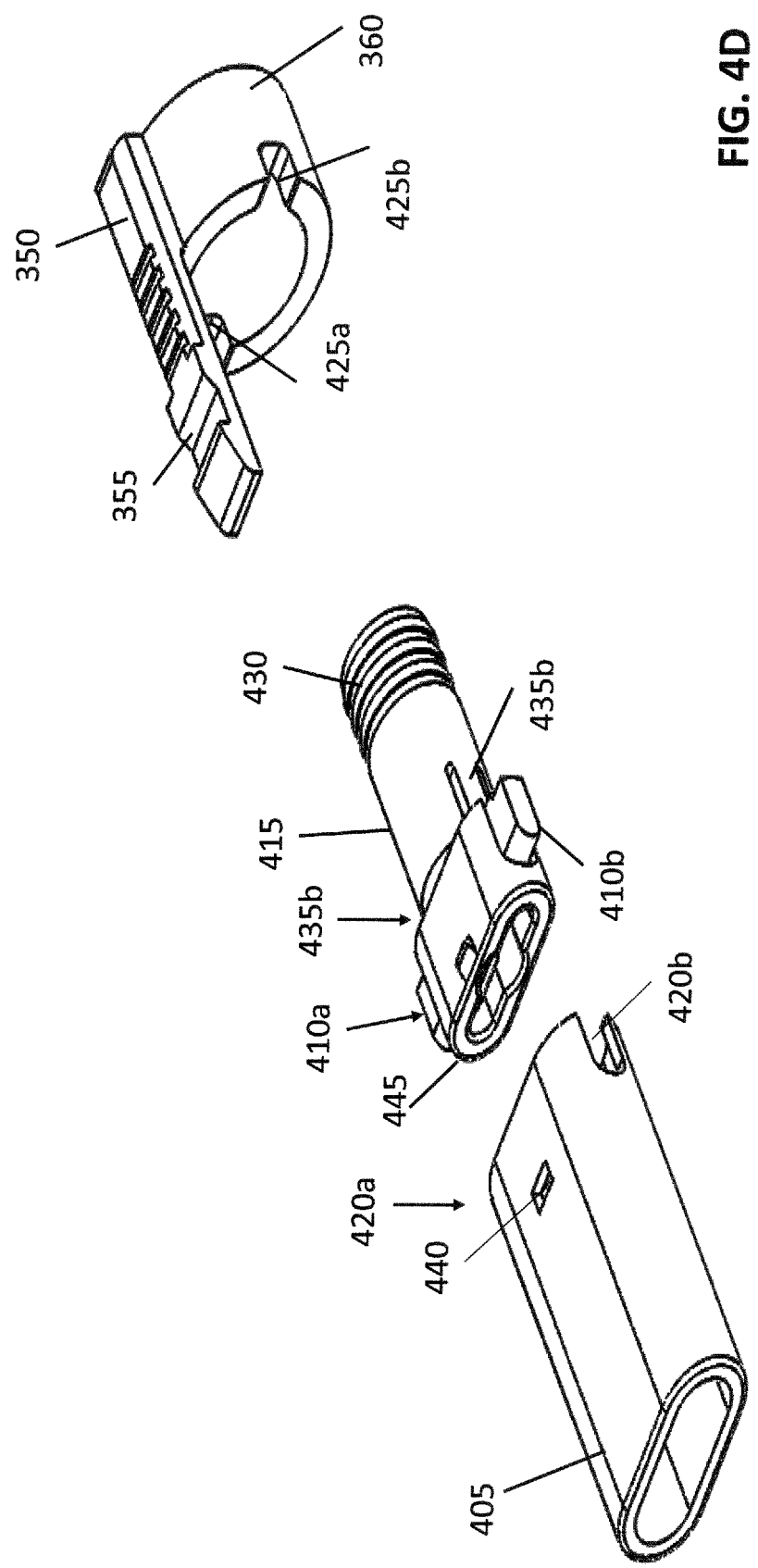
FIG. 4D depicts a perspective view of a connector assembly according to an embodiment.
Figure 4E:
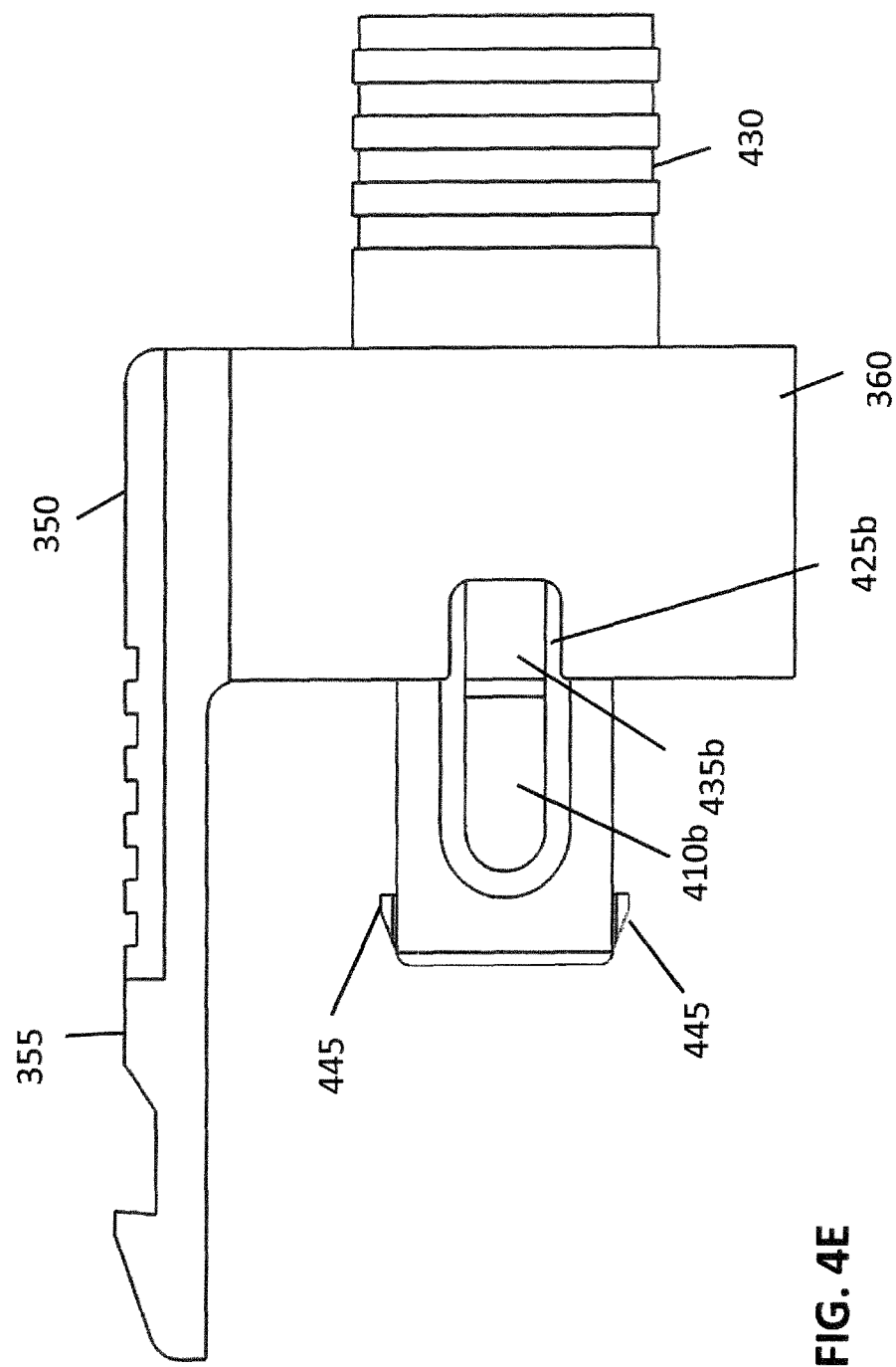
FIG. 4E depicts a side view of a latch component of a connector assembly according to an embodiment.
Figure 4F:
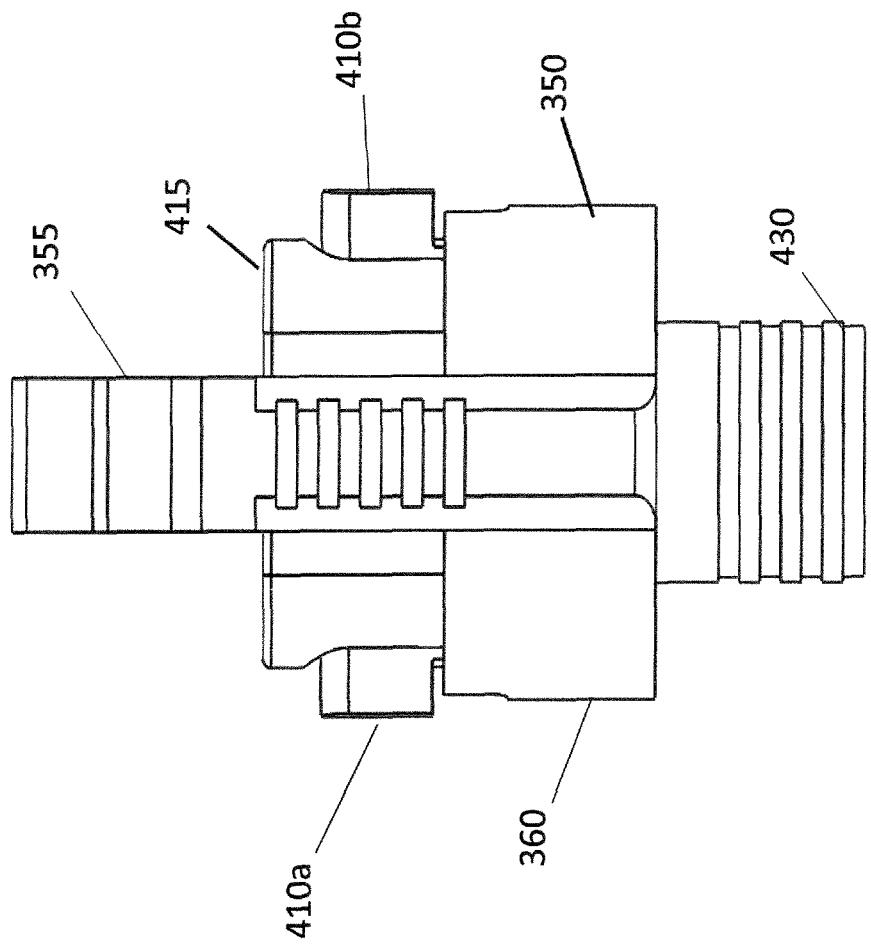
FIG. 4F depicts a top view of a latch component of a connector assembly according to an embodiment.

FIGS. 4C and 4D depict the housing (i.e., front portion) 405, rear portion 415 locking component 430, and latch component 350 in a side view and a perspective view, respectively. As shown in FIGS. 4C and 4D, the housing 405 may include channels configured to receive the compression elements 410a, 410b. In some embodiments, the housing 405 may include one or more openings 440 configured to receive a complementary projection 445 on the locking component 430 to secure the locking component in place within the connector assembly 400. FIGS. 4E and 4F depict the latch component 350 and the locking component 430 as arranged within the connector assembly 400 from a side view and a top-down view, respectively.

Figure 4G:
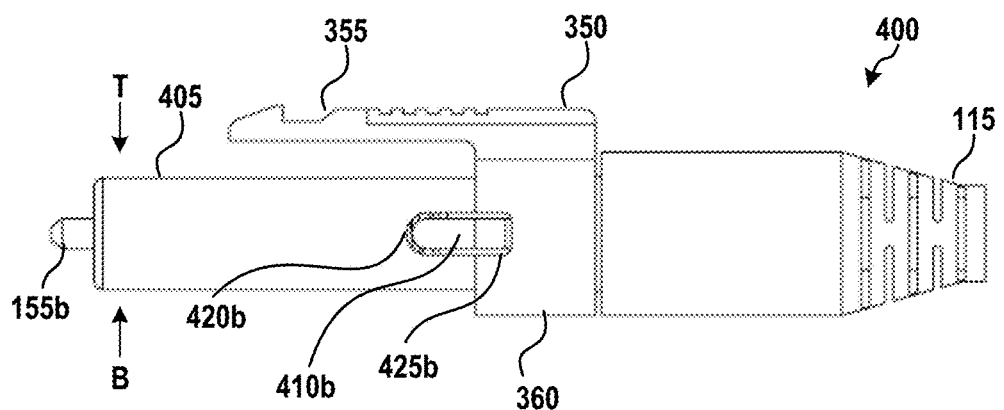
FIGS. 4G-4I depict a change in polarity of an illustrative connector assembly according to an embodiment.
Figure 4H:
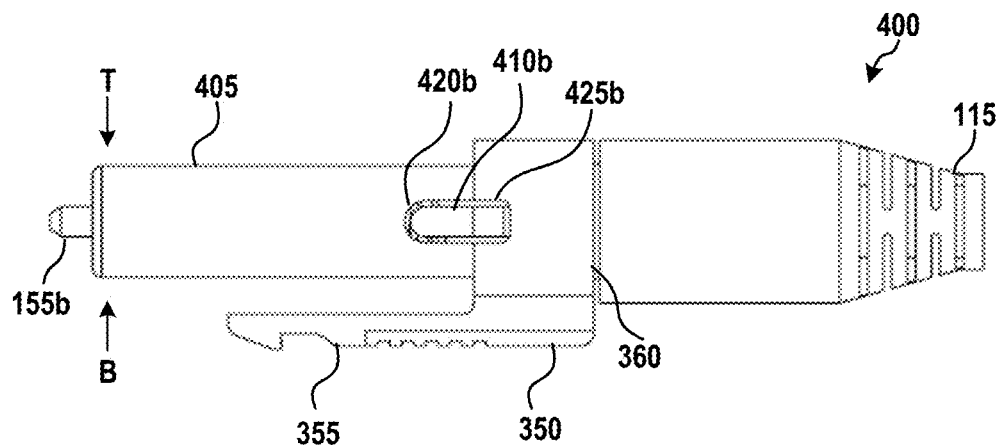
Figure 4I:
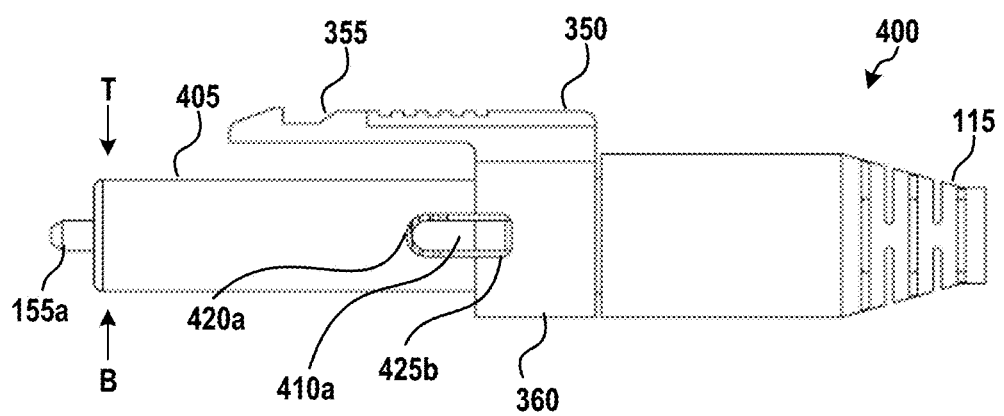

FIGS. 4G-4I depicts an illustrative polarity adjustment for the connector assembly 400. In FIG. 4G, the connector assembly 400 is arranged in a first polarity in which the connector assembly is configured to connect with an adapter with the second ferrule 155b on the right side and the first ferrule 155a on the left side of the connector assembly from a top-down perspective. The latch component 350 is arranged in a first polarity position on the locking component 430, with locking recess 425b visible in FIG. 4G and the thumb latch 355 being arranged over a top (T) surface of the housing 405. In FIG. 4H, the latch component 350 has been rotated to a second polarity position, in which locking recess 425b is visible in FIG. 4H and the thumb latch 355 is arranged under a bottom (B) surface of the housing 405. In FIG. 4I, the entire connection assembly 400 has been rotated such that the connection assembly may connect with an adapter in a second polarity with the second ferrule 155b on the left side and the first ferrule 155a on the right side of the connector assembly from a top-down perspective. Accordingly, the polarity of the connector assembly 400 may be adjusted by rotating the latch component 350 from a first polarity position to a second polarity position and rotating the connector assembly such that the thumb latch 355 is orientated to engage a corresponding adapter.

Figure 5:
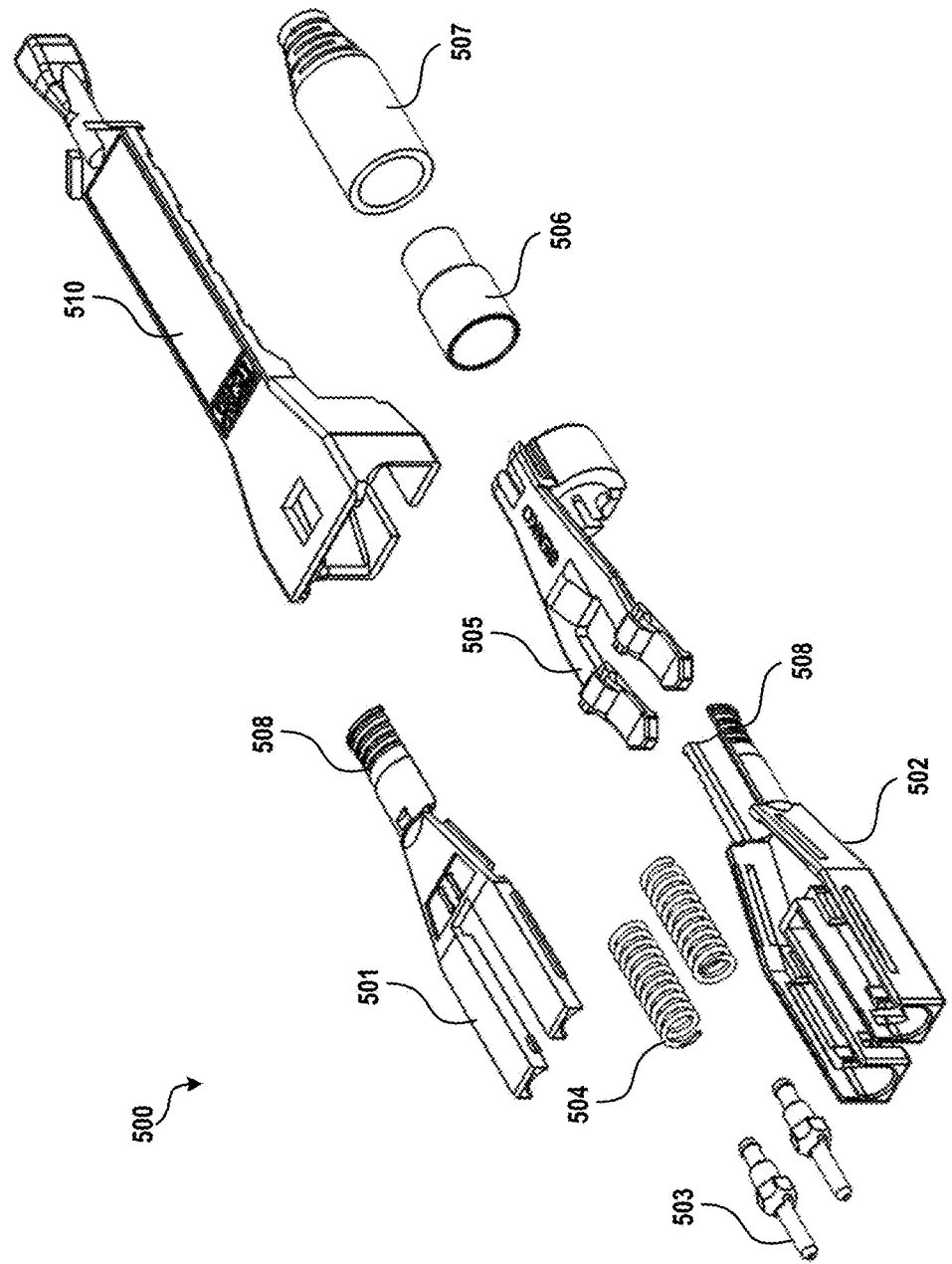
FIG. 5 depicts an exploded view of a connector assembly according to an embodiment.

FIG. 5 depicts an exploded view of an illustrative connector assembly according to various embodiments. As shown in FIG. 5, a connector assembly 500 may include a top housing component 501 and a bottom housing component 502. In some embodiments, the top housing 501 and the bottom housing 502 may be joined together in a "closed" configuration when the top housing 501 being coupled to the bottom housing 502. Alternatively, some embodiments may have an "open" configuration when the top housing component 501 is not coupled to the bottom housing component 502. When in the closed configuration, the top housing 501 and the bottom housing 502 may be securely coupled to each other using various means, such as a snap-fit, a friction-fit, or the like.

A cable (not shown) may extend through a boot 507, pass through a crimp ring 506 and then into the housing formed by the top housing 501 and the bottom housing 502. The cable may include two optical fibers (for instance, a transmitting optical fiber and a receiving optical fiber) terminating at one or more ferrule(s) 503. In some embodiments, two ferrules may be utilized, wherein a first ferrule may be coupled to a terminal end of a transmitting optical fiber and the second ferrule may be coupled to a terminal end of a receiving optical fiber, or vice versa. The crimp ring and/or crimp tube 506, which may include a material, such as a heat-shrink material, may encase a portion of the cable and may be secured to the cable. A back post 508, which may be made up of the combination of the top housing 501 and the bottom housing 502 may engage the crimp ring 506 at a distal end thereof.

In some embodiments, as the crimp ring 506 may be secured to the cable, thus the crimp ring may prevent movement of the back post 508 and, therefore, the main housing (501 and 502), toward the distal end of the connector assembly 500. In some further embodiments, the back post 508 may be molded or otherwise affixed to a portion of the top housing component 501 or the bottom housing component 502.

The ferrule(s) 503 may be arranged within (501 and 502) in two separate channels (as shown), or in a single combined channel. a first plug frame 150a and a second plug frame 150b, respectively. In this manner, the ferrule(s) (and plug frame(s)) 503 may be secured within the connector assembly 500 when the top housing 501 bottom housing 502 are in the closed configuration. In further embodiments, the ferrules(s) 503 may have a biasing force applied via one or more springs 504.

As also shown in FIG. 1, an embodiment may have a connection device 505 that allows the connector assembly to securely fasten into a receiver (e.g., adapter and/or transceiver). The connection device 505, in some embodiments, may be placed over a portion of the connector assembly (e.g., the back post 508). In a further embodiment, the connection device 505, may be rotatable around the back post 508 in order to allow for easy polarity change of the connector assembly 500. The connector assembly 500 may also comprise a push-pull tab 510, which will be discussed at further length herein.

Figure 6A:
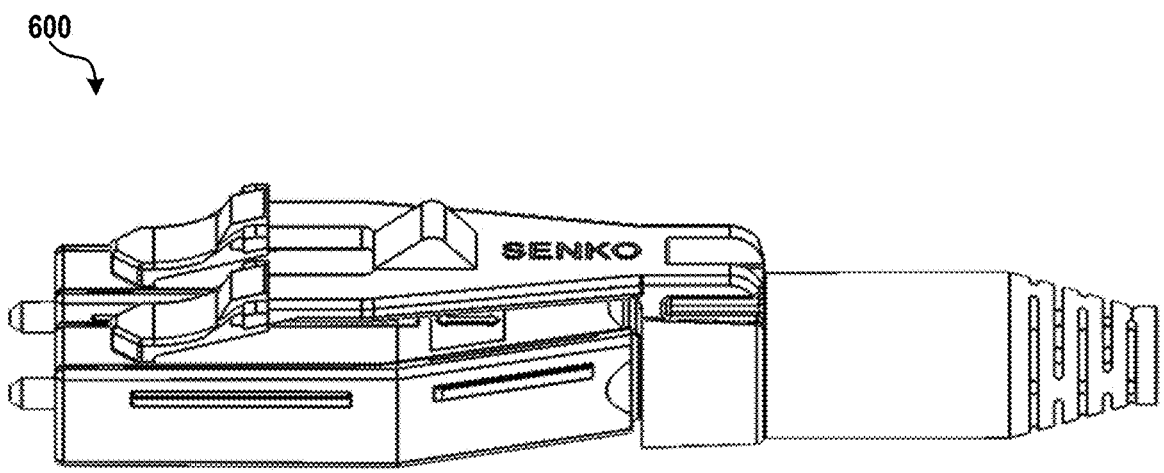
FIG. 6A depicts an illustrative example of connector assembly according to an embodiment.
Figure 6B:
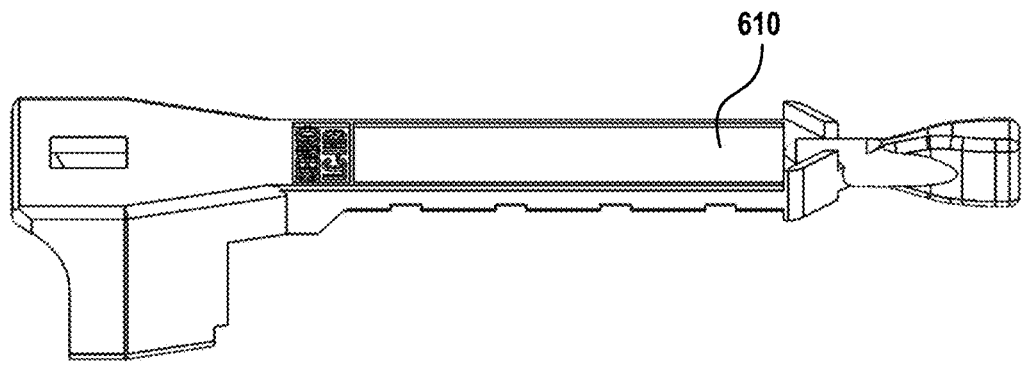
FIG. 6B depicts an illustrative example of push-pull tab according to an embodiment.
Figure 6C:
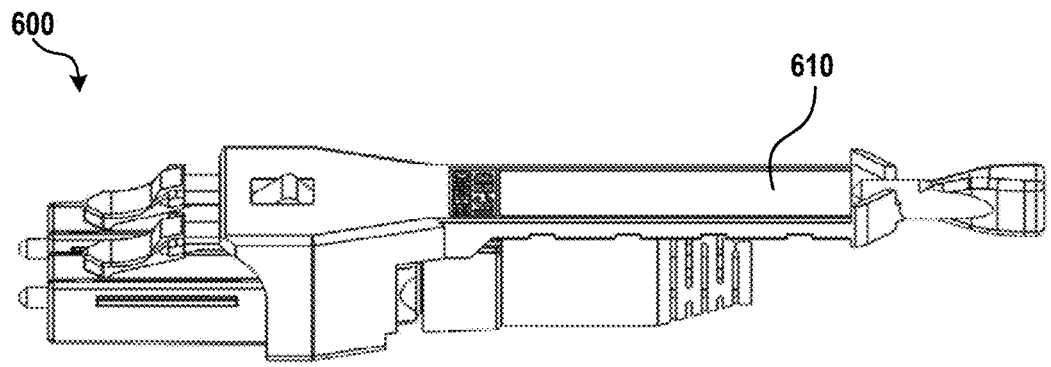
FIG. 6C depicts an illustrative example of the push-pull tab connected to the connector assembly according to an embodiment.
Figure 7A:
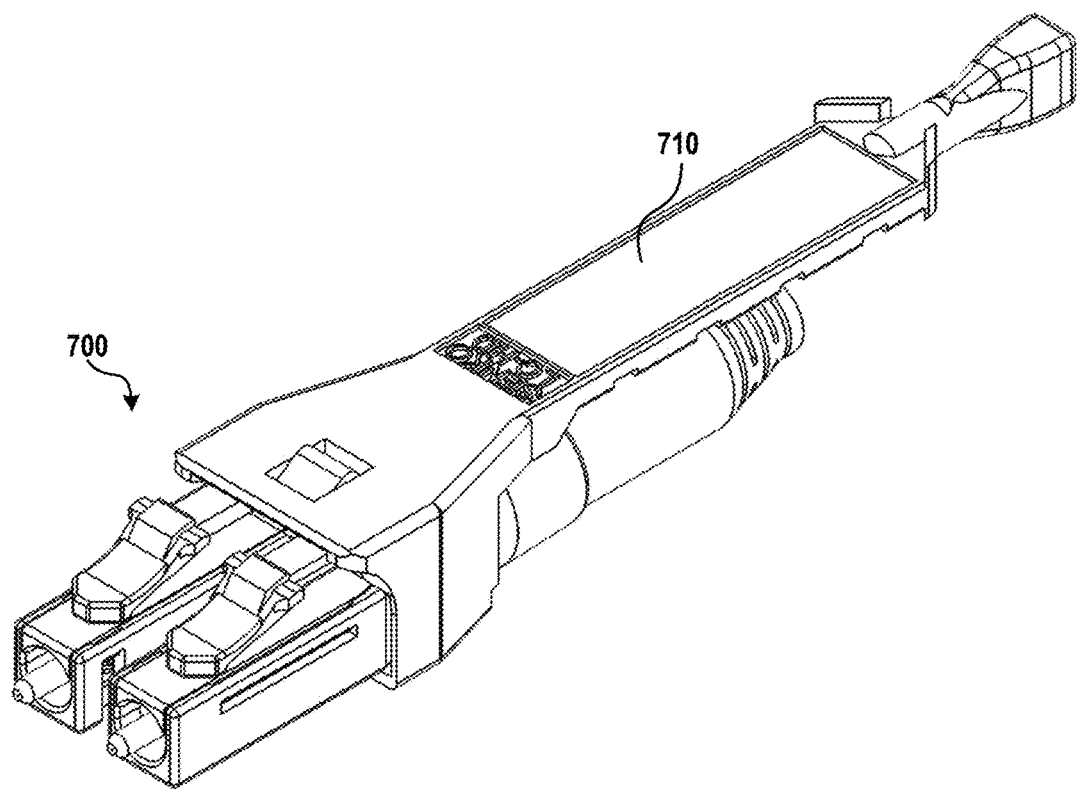
FIG. 7A depicts a perspective view of the push-pull tab connected to the connector assembly according to an embodiment.
Figure 7B:
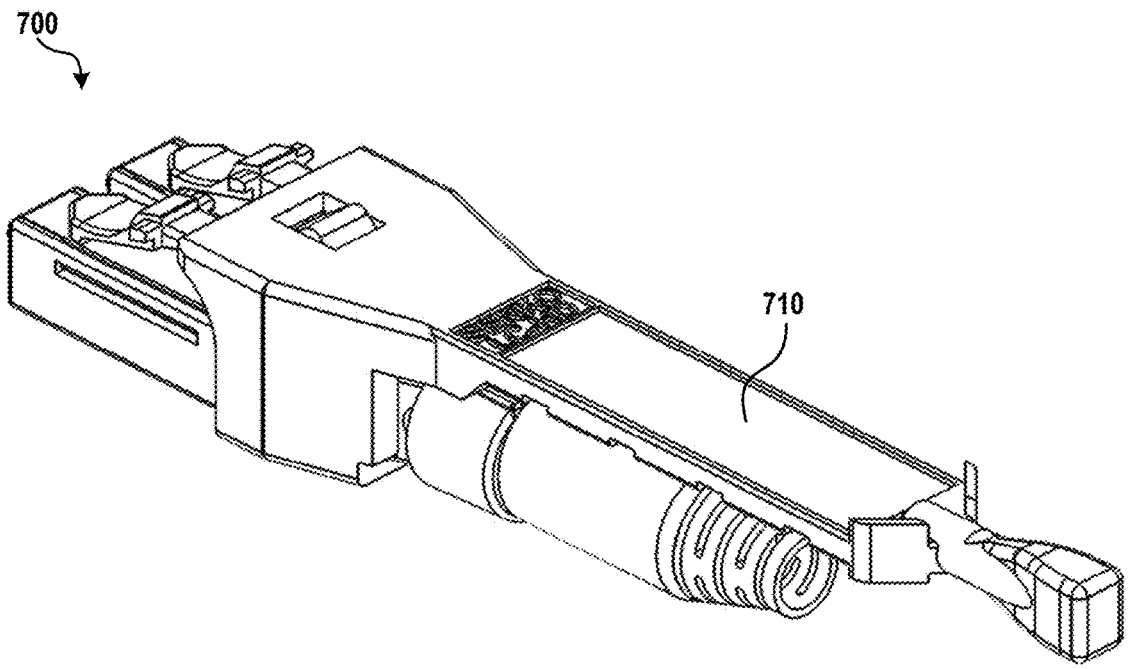
FIG. 7B depicts another perspective view of the push-pull tab connected to the connector assembly according to an embodiment.

A fully assembled connector assembly 600, is shown in FIG. 6A. FIG. 6B further shows a push-pull tab 610 according to a non-limiting example embodiment. In some embodiments, and as shown, the push-pull tab 610, may be removably and/or releasably attached to the connector assembly. Accordingly, and as shown in FIG. 6C, a connector assembly 600 and push-pull tab 610 may be combined into a single unit to allow for easy insertion and removal from a receiving device. Close up perspective views of a connector assembly 700 and push-pull tab 710 are shown in FIGS. 7A and 7B.

Figure 8A:
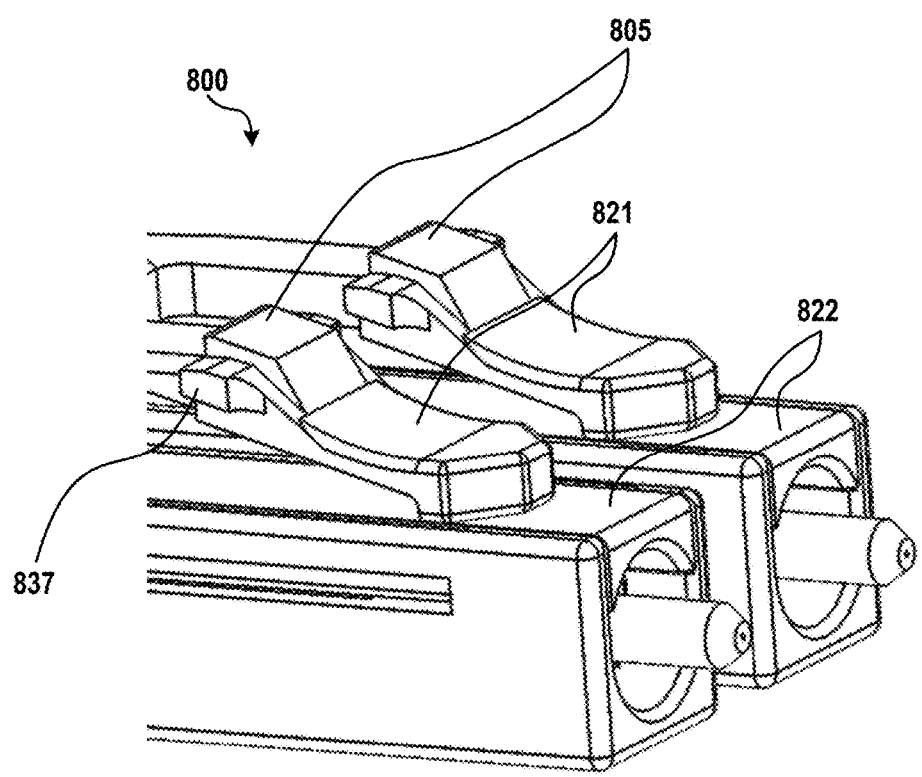
FIG. 8A depicts a detailed view of a portion of the connector assembly according to an embodiment.
Figure 8B:
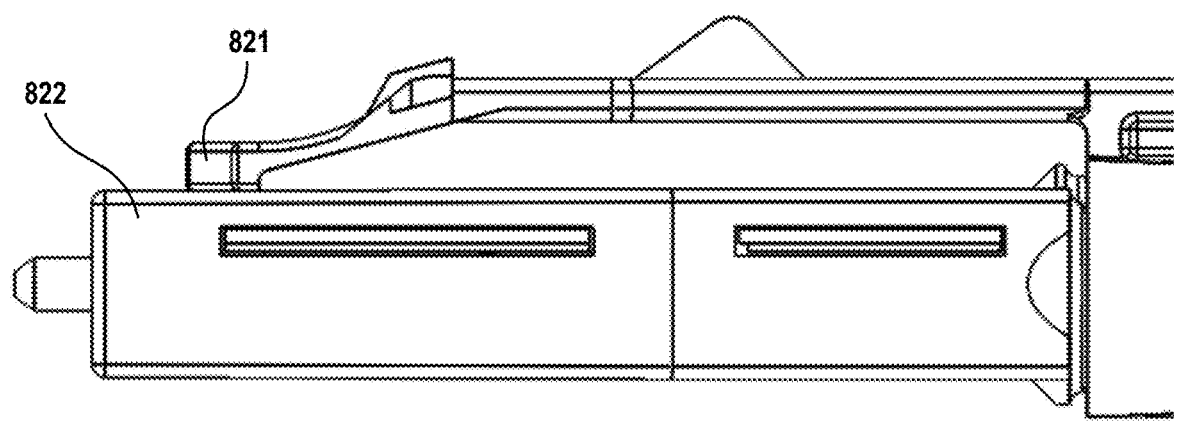
FIG. 8B depicts a side view of a portion of the connector assembly according to an embodiment.

Referring to FIGS. 8A and 8B, an embodiment is shown wherein the connector assembly 800 comprises one or more flexible latching arms 821. The flexible latching arm 821 may have a connection device 805. The connection device 805 is further detailed herein as it relates to an adapter and/or transceiver. Specifically, the connection device 805 interlocks with a recess in an adapter/transceiver. The connection device 805 may also comprise one or more connector hooks 837. In some embodiments, the connector hooks 837 may be used via a user's figures and/or tool to compress the connection device 805 in order allow for removal of a connector assembly 800 from an adapter/transceiver.

As shown, the one or more flexible latching arms 821 may contact the surface of one or more of the channels 822. The contact of the latching arm 821 with the channel 822 provides additional support to the latching arm. In some embodiments, the latching arm 821 is used to secure the connection of the connector assembly 800 with a receiving device (e.g., and adapter and/or transceiver). Thus, the contact between the latching arms 821 and the channels 822 enables the one or more latching arms to more firmly connect and thereby better secure the connector assembly 800 within the receiving device.

As discussed herein, the connector assembly 900 may be configured such that a change in polarity of the connector is possible. As shown in FIG. 9A, the connection device may be rotated about a horizontal axis (i.e., rotated around the back post 908 (FIG. 5 at 508). In some embodiments, and as shown in FIG. 9B, a recess 931 may be located on the back post 908. It should be understood, the recess 931 may be located on various outer surfaces (e.g., the crimp ring (FIG. 5 at 506), the cable boot (FIG. 5 at 507), etc.). Furthermore, in some embodiments, there may be multiple recesses 931 located on the connector assembly 900, such as, for example, one on the top and one on the bottom of the back post 908. The connector device 905, may comprise a protrusion 932 that is complementary (i.e., matching) to the recess 931. Thus, in some embodiments, the protrusion 932 may securely fasten the connector device 905 to housing using the recess 931.

Figure 10A:
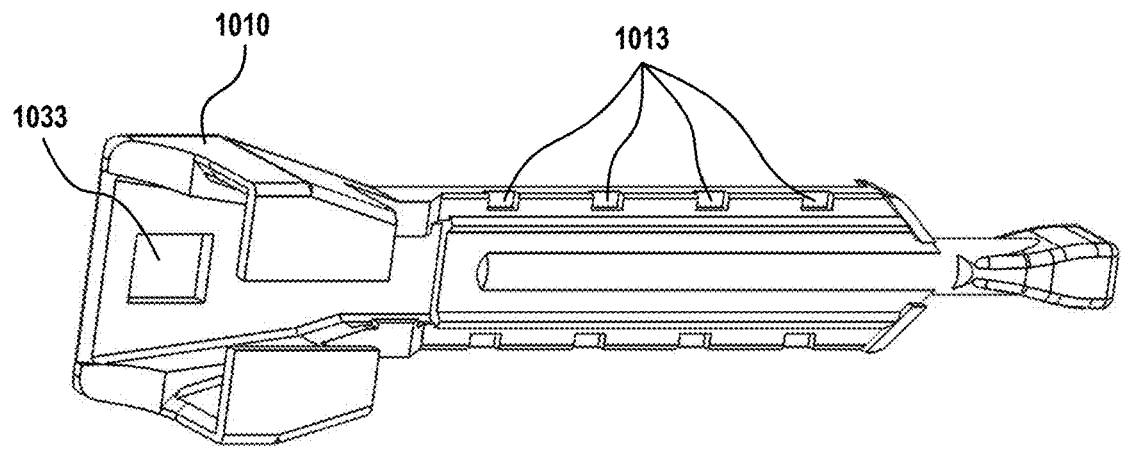
FIG. 10A depicts an underside view of a push-pull tab according to an embodiment.
Figure 10B:
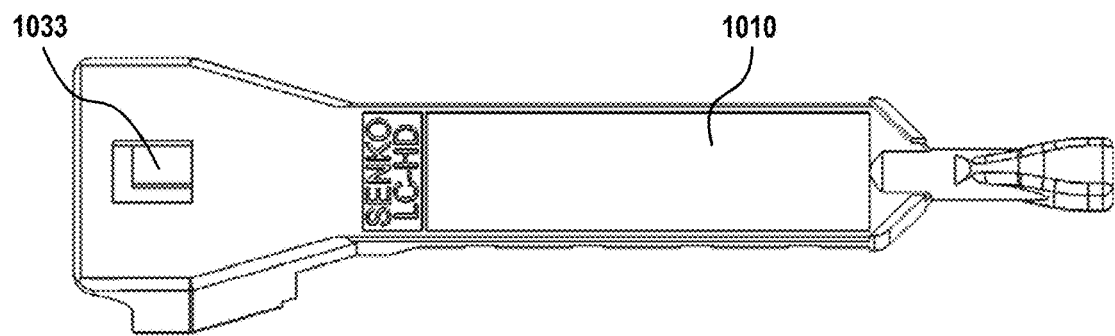
FIG. 10B depicts a topside view of a push-pull tab according to an embodiment.

Referring now to FIGS. 10A-10B, a top and bottom view of a push-pull tab 1010 is shown according to some embodiments. As shown in FIG. 10A, the push-pull tab 1010 may comprise a window or cutout 1033 at or near the proximal end of the push-pull tab and a push-pull knob 1011 near the distal end. It should be understood that the location and dimensions of the window 1033 may vary with different embodiments, and that the dimensions and location as shown is for illustrative purposes only. In further embodiments, the push-pull tab 1010 may comprise one or more recesses 1013.

Figure 10C:
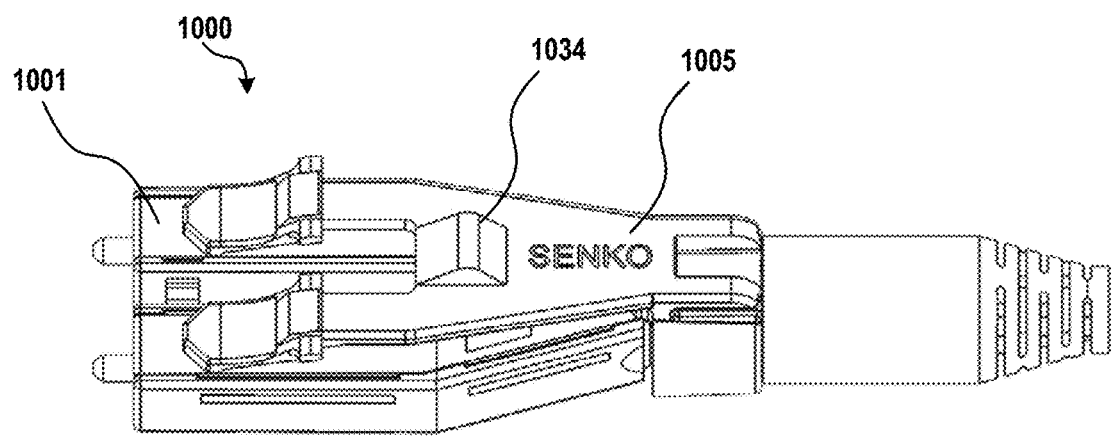
FIG. 10C depicts a perspective view of a connector assembly according to an embodiment.

As shown in FIG. 10C, in some embodiments, the connector device 1005 may have a protrusion 1034. The protrusion 1034 may be configured to fit through or inside of the cutout 1033 of the push-pull tab 1010. Referring back to FIGS. 7A and 7B, an illustrative embodiment is shown where the push-pull tab is recoverably connected to the connector assembly.

Accordingly, when the push-pull tab 1010 moved longitudinally along the connector assembly 1000, the protrusion 1034 impacts the side of the window 1033. In some embodiments, when the protrusion 1034 impacts the edge of the window 1033, the ramp portion of the protrusion slides along the edge of the window and forces the connection device 1005 closer to the top housing component 1001. When the connection device 1005 is compressed (i.e., forced closer to the top housing component 1001) the connector assembly 1000, can be easily removed from a receiver (e.g., adapter and/or transceiver).

Figure 11:
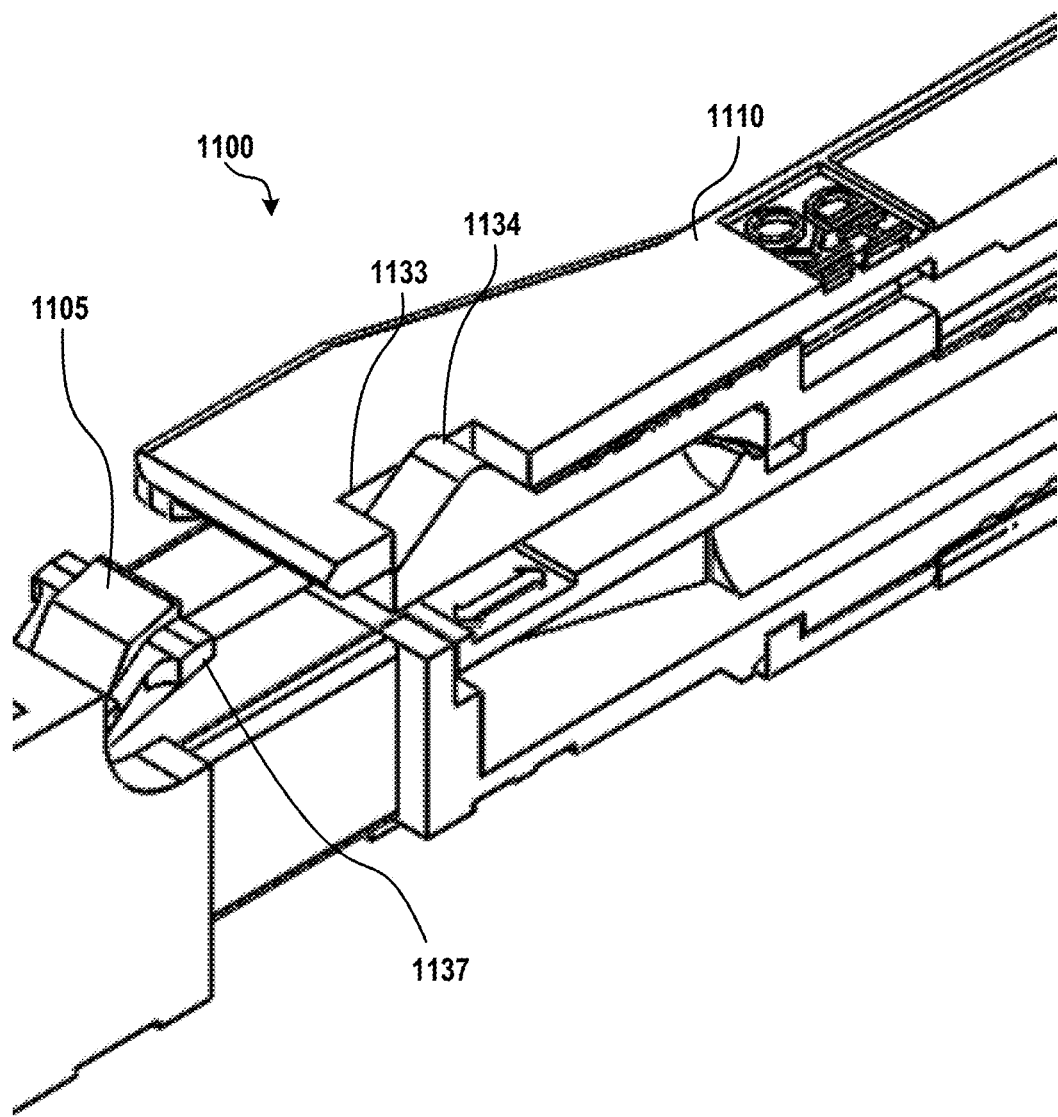
FIG. 11 depicts a detailed view of a protrusion and window interacting according to an embodiment.

A further example embodiment is shown in FIG. 11, which specifically shows a cross section of the connector assembly and the push-pull tab 1110. As shown, the protrusion 1134 is placed through the window 1133. Additionally, the small protrusion (not shown) resides in the recess (not shown) of the connector body. FIG. 11 also illustrates an example embodiment that has a connection device 1105 with connector hooks 1137. As depicted, the connector assembly may be inserted into an adapter and/or transceiver. It should be understood, that various alternative embodiments may exist, and that those discussed herein and illustrated in the figures are simply for explanatory purposes.

Figure 12A:
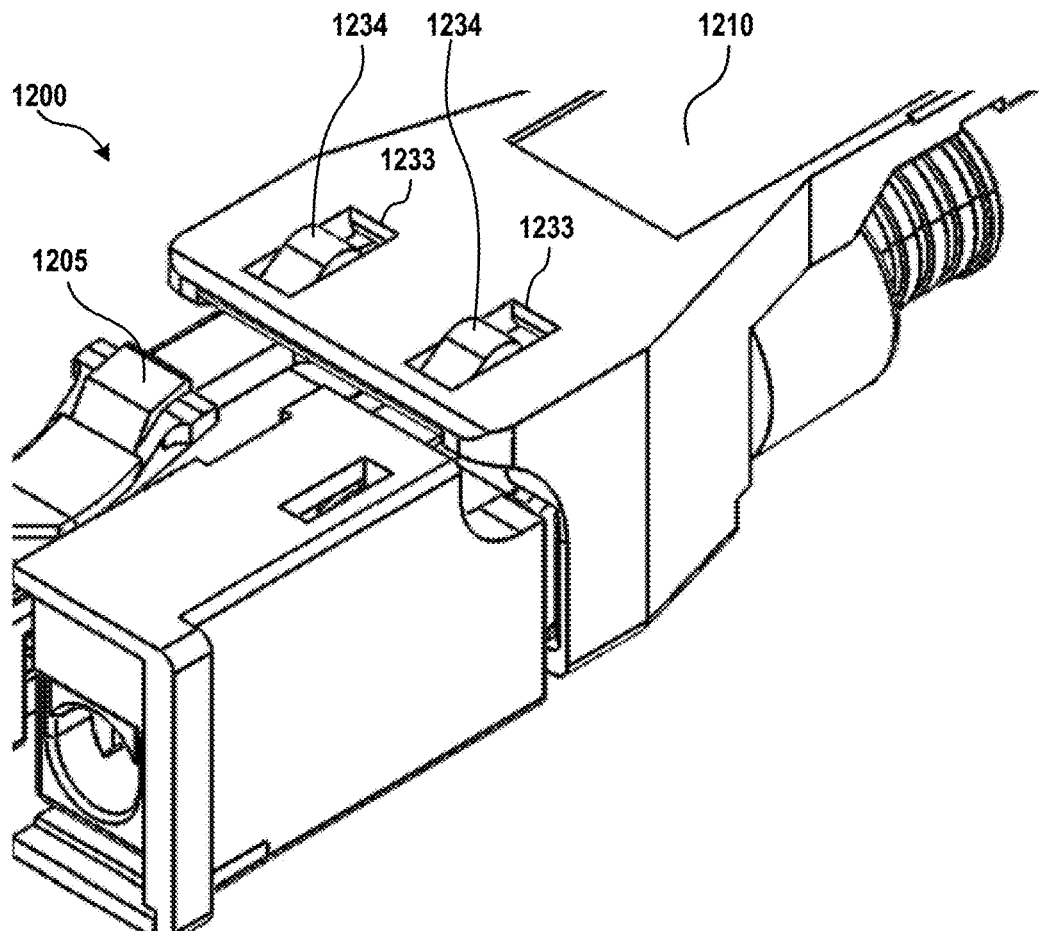
FIG. 12A depicts an illustrative view of a push-pull tab connected to a connector assembly according to an embodiment.
Figure 12B:
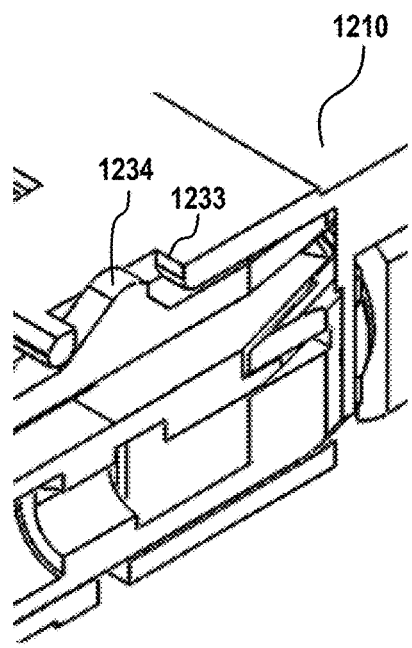
FIG. 12B depicts a detailed view of a portion of the illustrative view of a push-pull tab connected to a connector assembly according to an embodiment and shown in FIG. 12A.
Figure 12C:
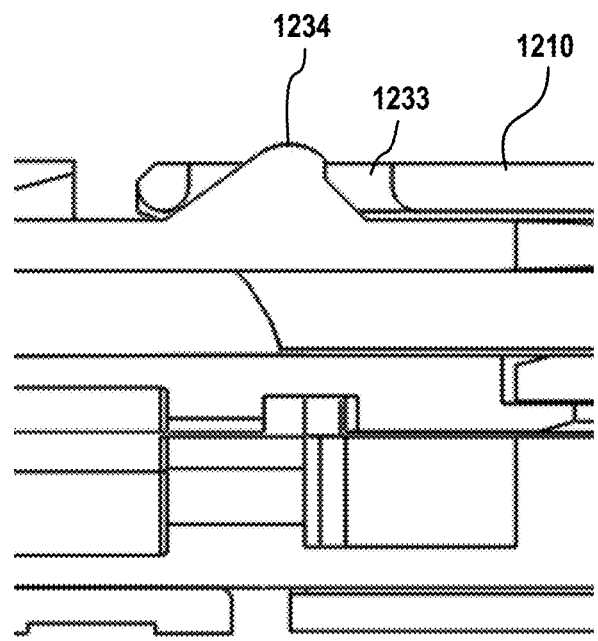
FIG. 12C depicts a detailed view of a portion of the illustrative view of a push-pull tab connected to a connector assembly according to an embodiment and shown in FIG. 12A.

For example, an as shown in FIG. 12A-12C, some embodiments may have more than one protrusion 1234 and more than one window 1233. Thus, when the push-pull tab 1210 moved horizontally along the connector assembly 1200, the protrusion(s) 1234 impact the side of the window(s) 1233. In some embodiments, when the protrusions 1234 impact the edge of the windows 1233, the ramp portion of the protrusions slides along the edge of the windows and forces the connection device 1205 closer to the top housing component (not shown). When the connection device 1205 is compressed (i.e., forced closer to the top housing component) the connector assembly 1200, can be easily removed from a receiver (e.g., adapter and/or transceiver).

Figure 12D:
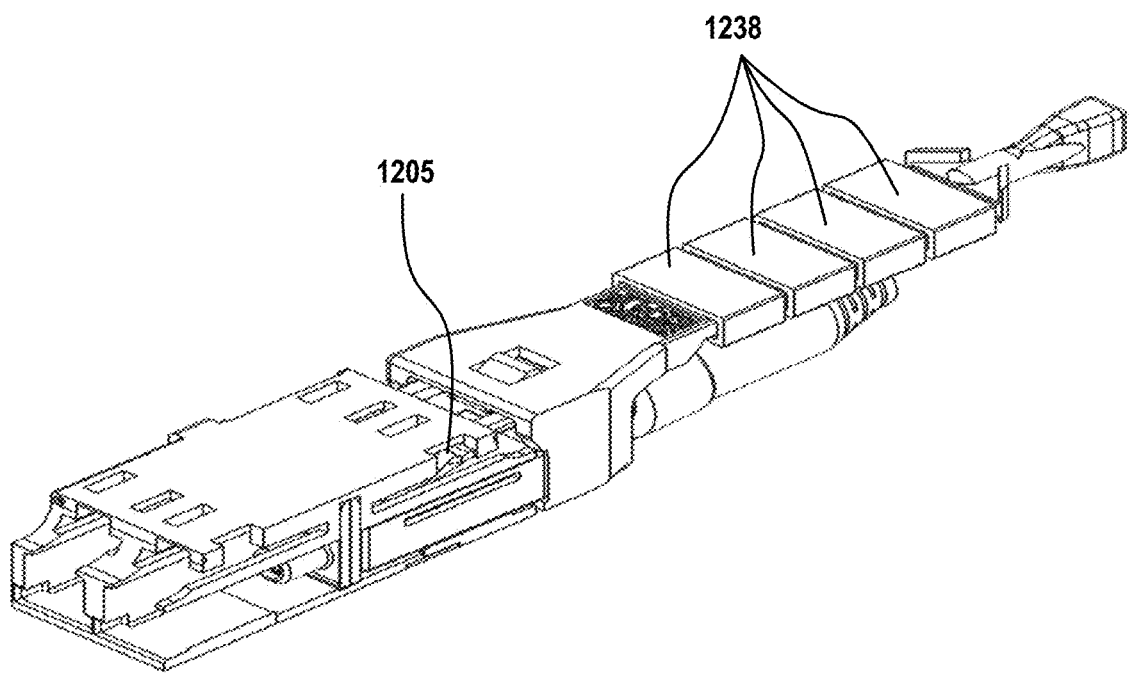

As shown in FIG. 12D, some embodiment may utilize identification tabs 1237 to identify a connector as inserted into an adapter/transceiver, via a connection device 1205 as shown. The identification tabs 1237 may be made of various materials and have various properties (i.e., color, etc.)

Figure 13:
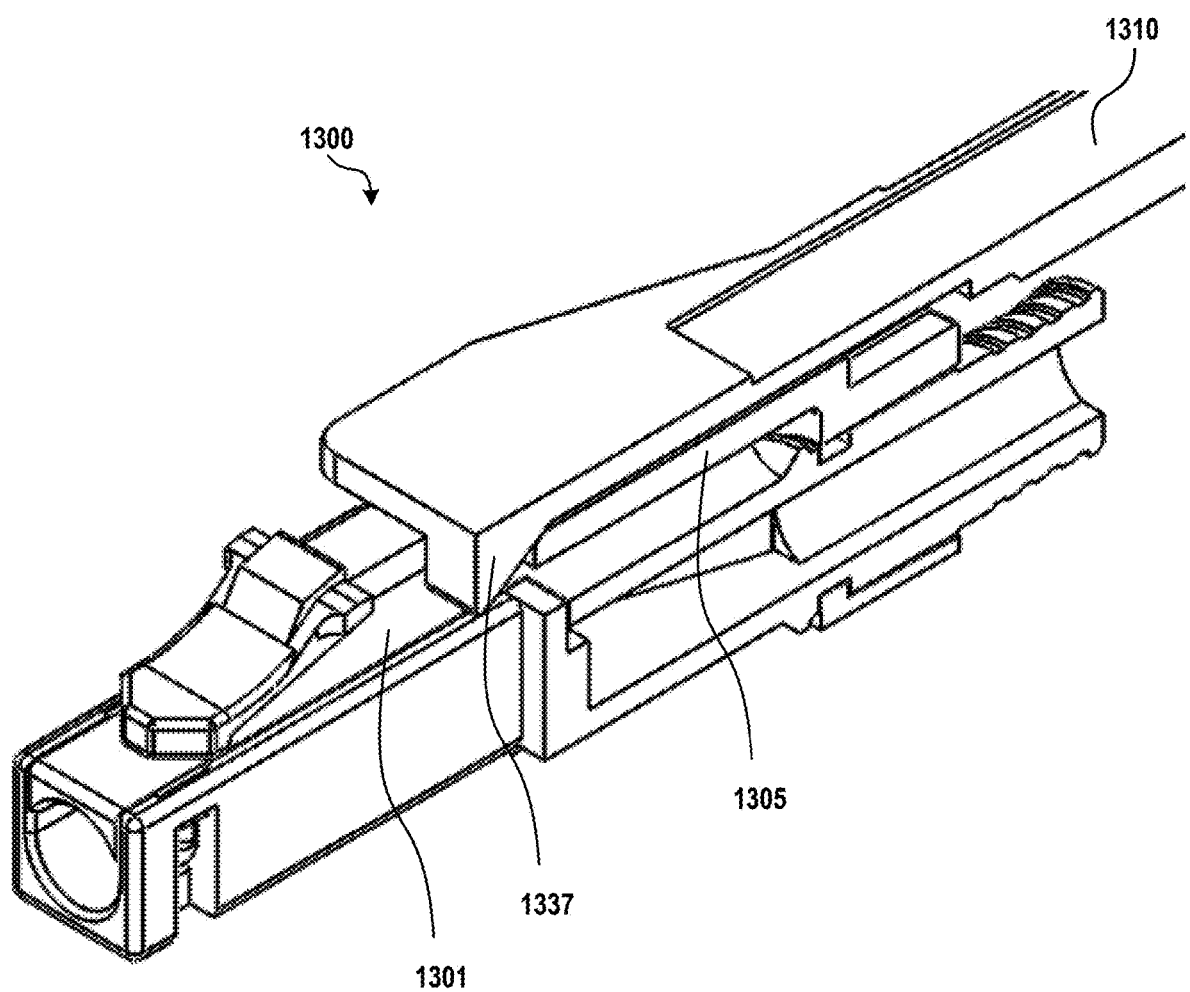
FIG. 13 depicts a cross-sectional view of a push-pull tab connected to a connector assembly according to an embodiment.

An alternative embodiment of a connector assembly 1300 is shown in FIG. 13 in a cross-sectional view. Accordingly, some embodiments, such as that shown in FIG. 13, may not utilize a protrusion/window arrangement as discussed herein. Instead, a push-pull tab 1310 may have an inverted ramp 1337 at the proximal end of the push-pull tab. Thus, when the push-pull tab 1310 is moved (e.g., horizontally to the connector assembly 1300) the inverted ramp 1337 impacts the connection device 1305 forcing the connection device down towards the top housing component 1301. When the connection device 1305 is compressed (i.e., forced closer to the top housing component 1301) the connector assembly 1300, can be easily removed from a receiver (e.g., adapter and/or transceiver).

Figure 14:
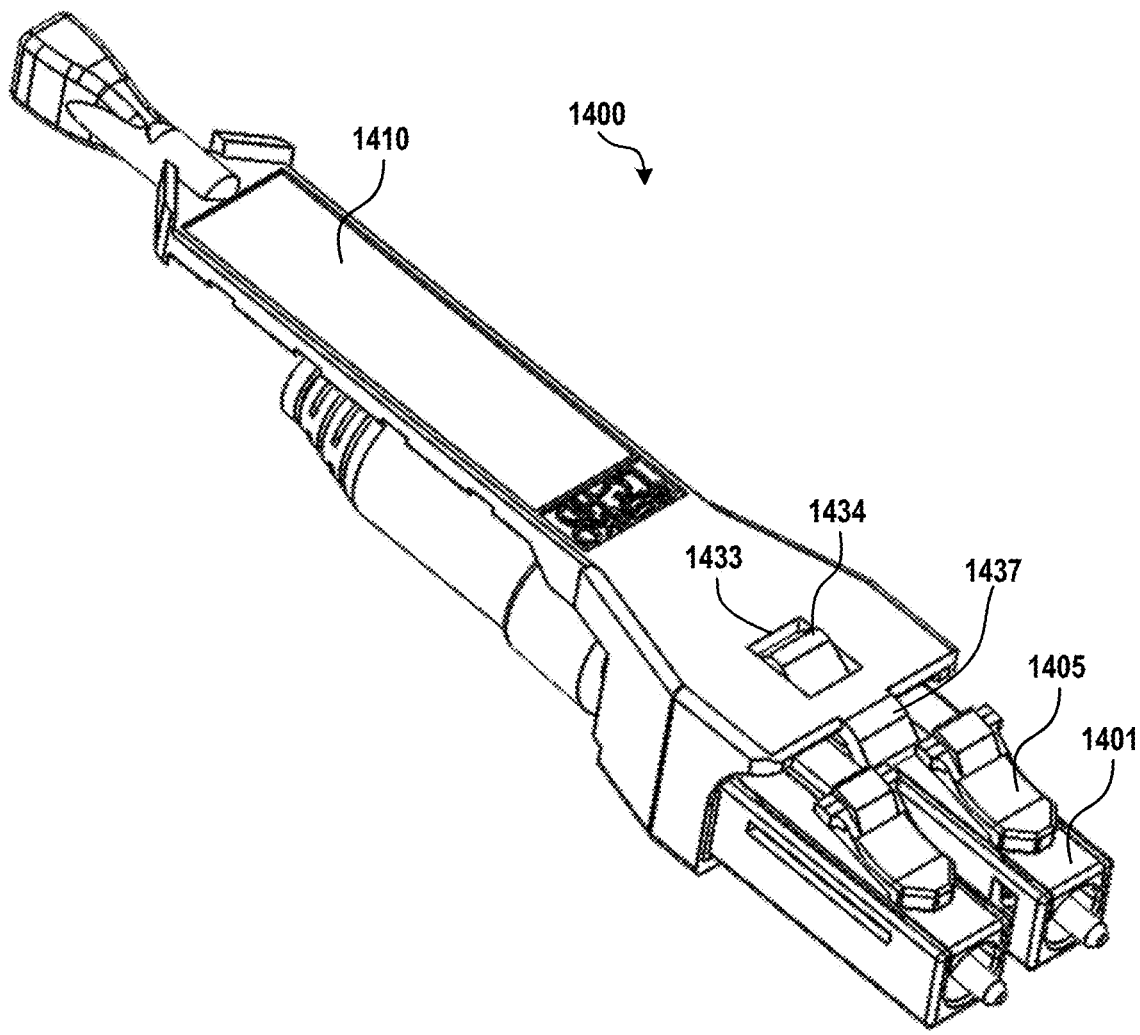
FIG. 14 depicts a perspective view of a push-pull tab connected to a connector assembly according to an embodiment.
Figure 15A:
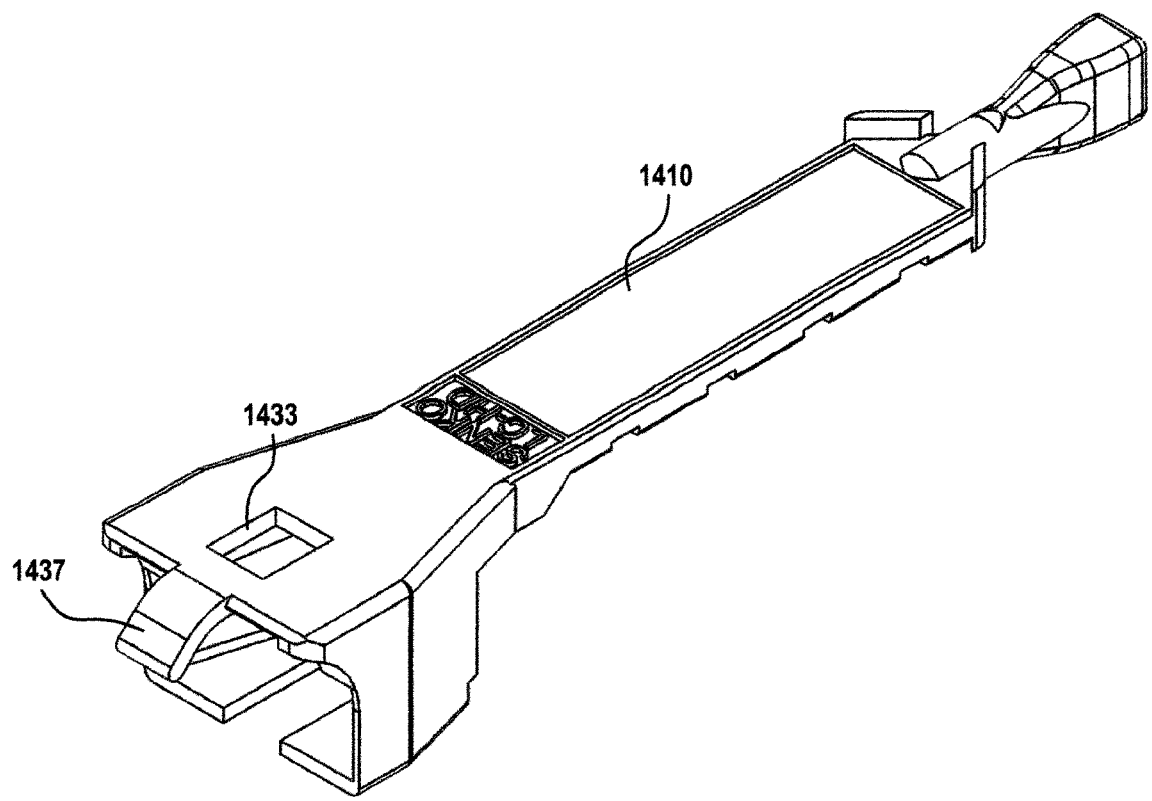
FIG. 15A depicts a perspective view of a push-pull tab according to an embodiment.
Figure 15B:
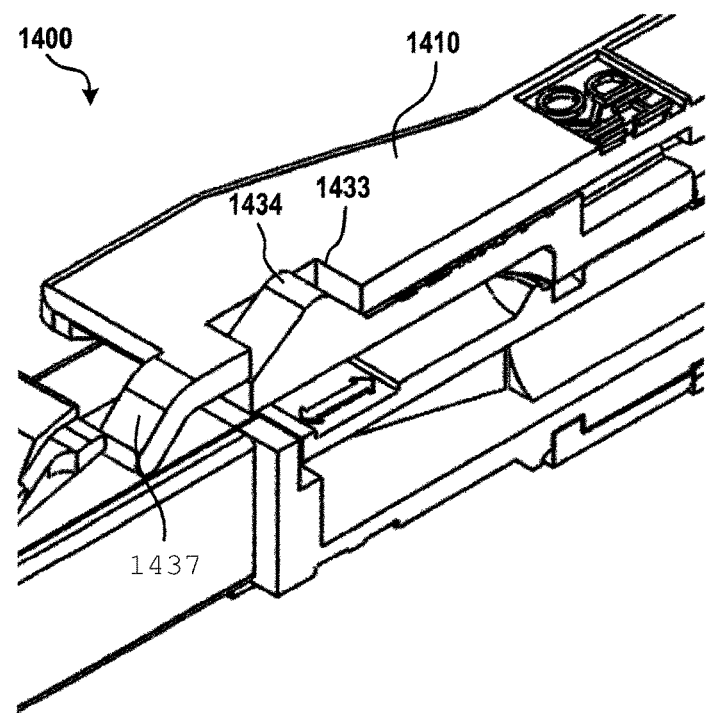
FIG. 15B depicts a detailed view of a push-pull tab connected to a connector assembly according to an embodiment.

A further alternative embodiment of a connector assembly 1400 is shown in FIG. 14. Accordingly, some embodiments, such as that shown in FIG. 15, may utilize both a protrusion 1434 and window 1433 arrangement as well as an inverted ramp 1437 at the proximal end of the push-pull tab. Thus, when the push-pull tab 1410 is moved (e.g., horizontally to the connector assembly 1400) the inverted ramp 1437 impacts the front connection device 1405 and the protrusion 1434 impact the edge of the window 1433 thus, similar to embodiments discussed previously, forcing the connection device down towards the top housing component 1401. When the connection device 1405 is compressed (i.e., forced closer to the top housing component 1401) the connector assembly 1400, can be easily removed from a receiver (e.g., adapter and/or transceiver). Detailed views of the push-pull tab 1410 and a cross-sectional view of the connector assembly 1400 are presented in FIGS. 15A and 15B.

Figure 16A:
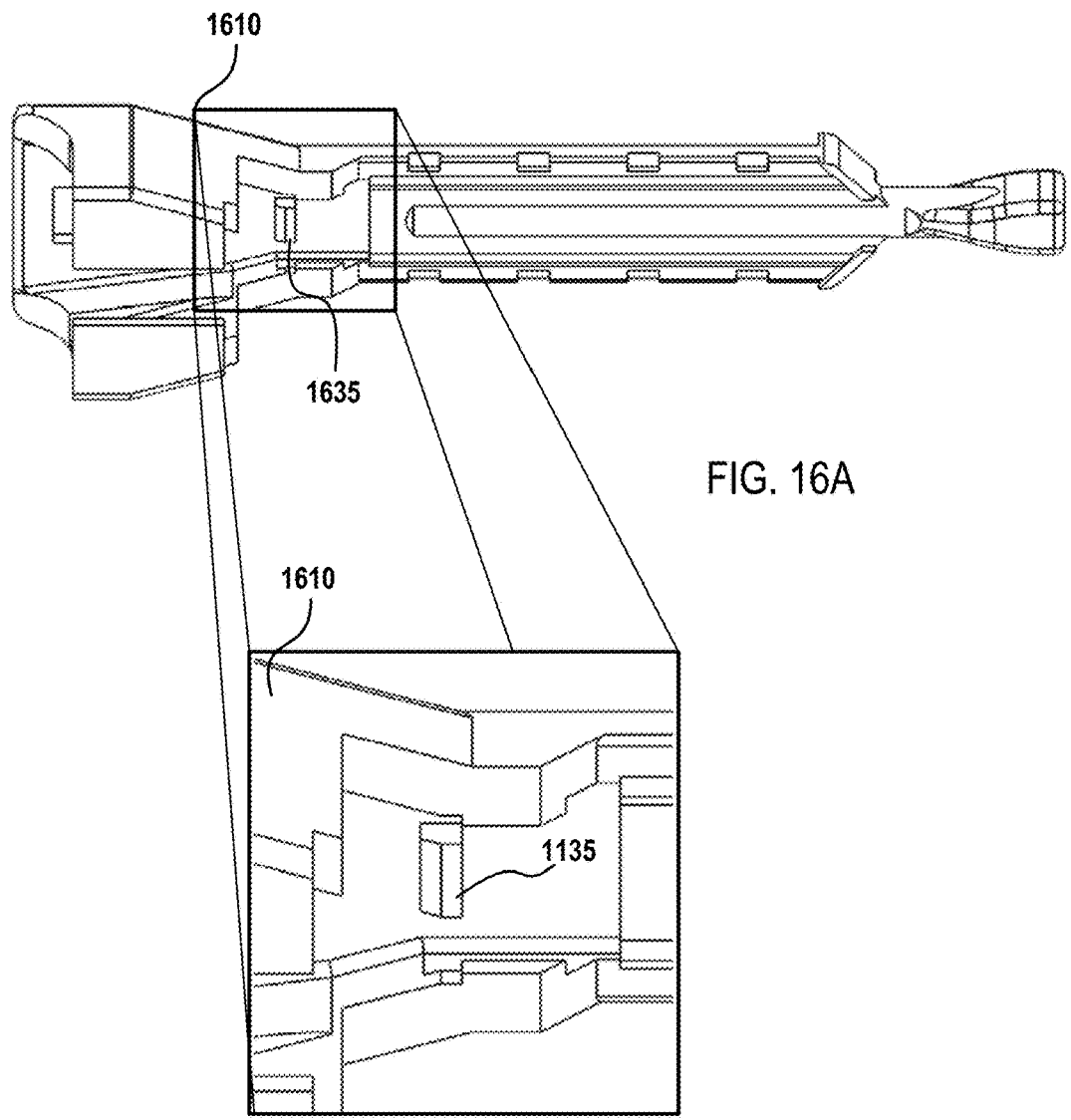
FIG. 16A depicts a detailed view of a small recess on the push-pull tab according to an embodiment.
Figure 16B:
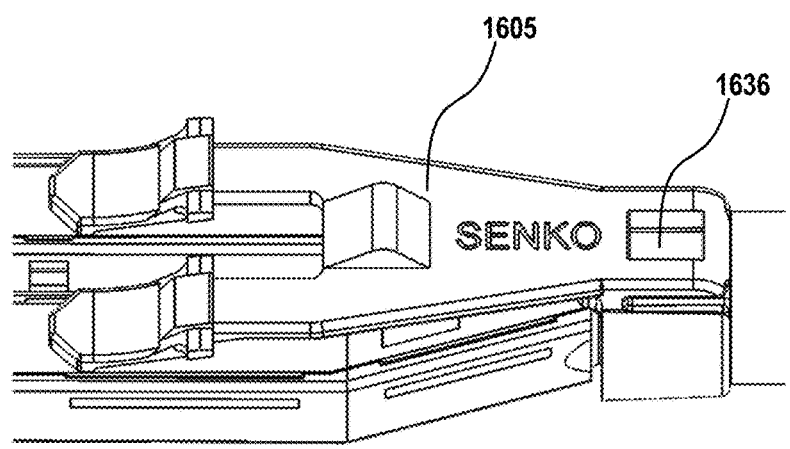
FIG. 16B depicts a perspective view of the top of the latching component according to an embodiment.
Figure 17:
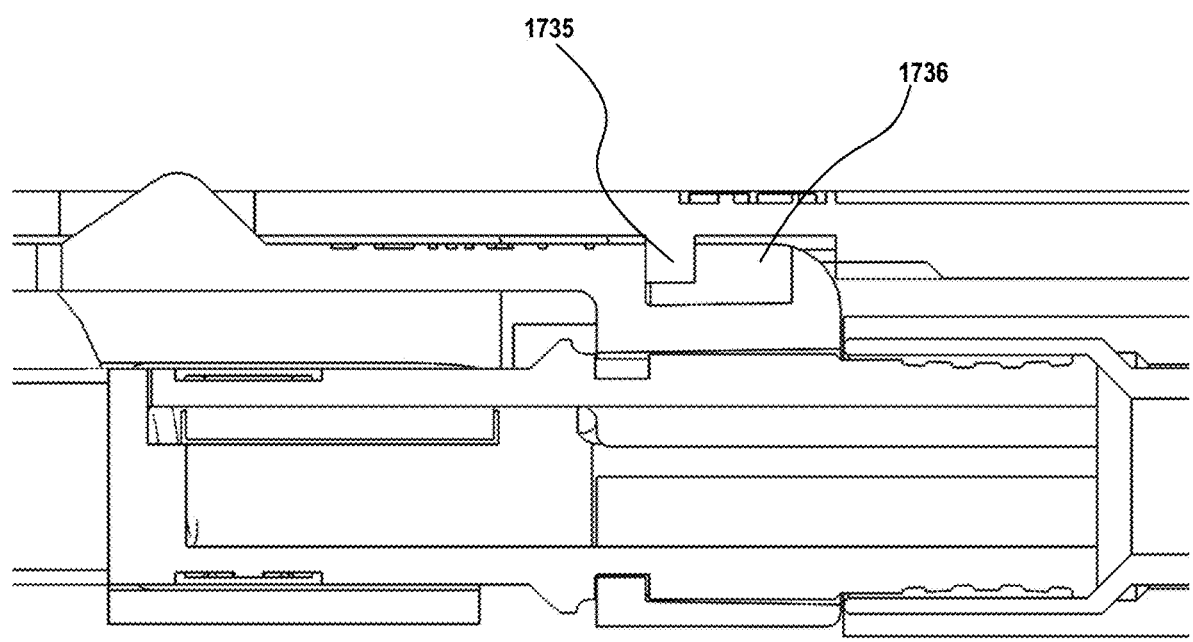
FIG. 17 depicts a detailed cross-sectional view of a small protrusion interacting with a small recess according to an embodiment.

In a further embodiment, such as that shown in FIGS. 16A-16C, a push-pull tab 1610, may have a small protrusion 1635 on the underside of the push-pull tab. FIG. 16B shows a detailed view of the small protrusion 1635 on the push-pull tab 1610. In some embodiments, the small protrusion 1635 is inserted into a recess 1636 on the connection device 1605. In some embodiments, this restricts the horizontal movement of the push-pull tab along the connector assembly (not shown). As shown in FIG. 17, the small protrusion 1735 easily fits into the recess 1736.

As shown in FIG. 17, the small protrusion 1735 is impacting the front wall of the recess 1736. This impact limits the forward movement of the push-pull tab 1710. This serves multiple functions in various embodiments. For example, the impact of the small protrusion 1735 with the recess 1736 allows a user to apply substantial forward force to the connector assembly (not shown) via the push-pull tab 1710.

Figure 18A:
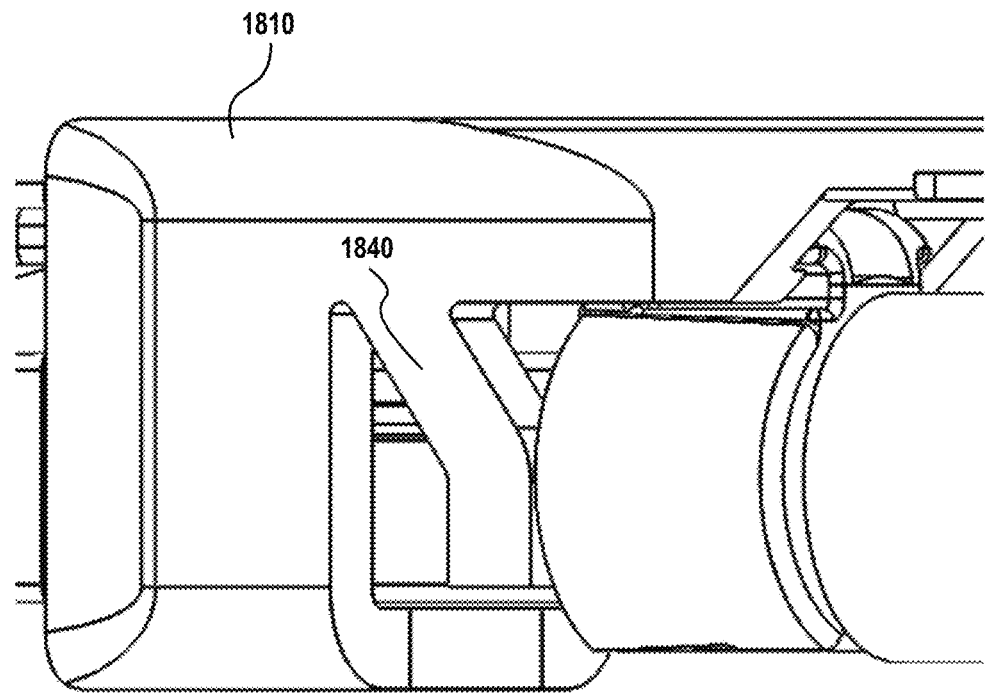
FIG. 18A depicts a perspective view of a tension bar on the push-pull tab.
Figure 18B:
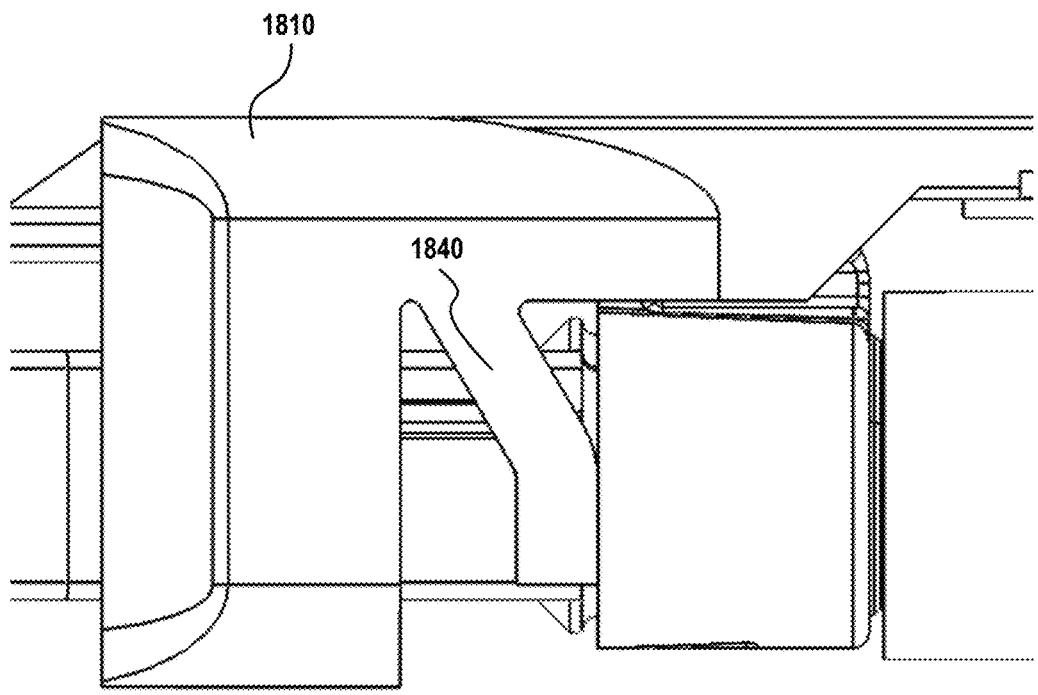
FIG. 18B depicts a side view of a tension bar on the push-pull tab.

Referring now to FIGS. 18A and 18B, as discussed herein, the push-pull tab 1810 may move in relation to the connector assembly (e.g., move horizontally with respect to the connector assembly). In some embodiments, the push-pull tab 1810 may have a tension member 1840 which applies a biasing force against a portion of the connector assembly thus forcing the push-pull tab in one direction. The non-limiting example illustrated in FIGS. 18A and 18B show the tension member 1840 applying a biasing force to move the push-pull tab 1810 toward the front of the connector assembly (i.e., the location of the ferrules). It should be understood that this is a non-limiting example, and that one or more tension members may be used, and that the biasing may be in different directions. Moreover, there may be tension members applying a biasing force in more than one direction or opposing directions. Additionally, as discussed herein, a spring system or any method of applying a biasing force may be utilized for the embodiments discussed herein.

Figure 19A:
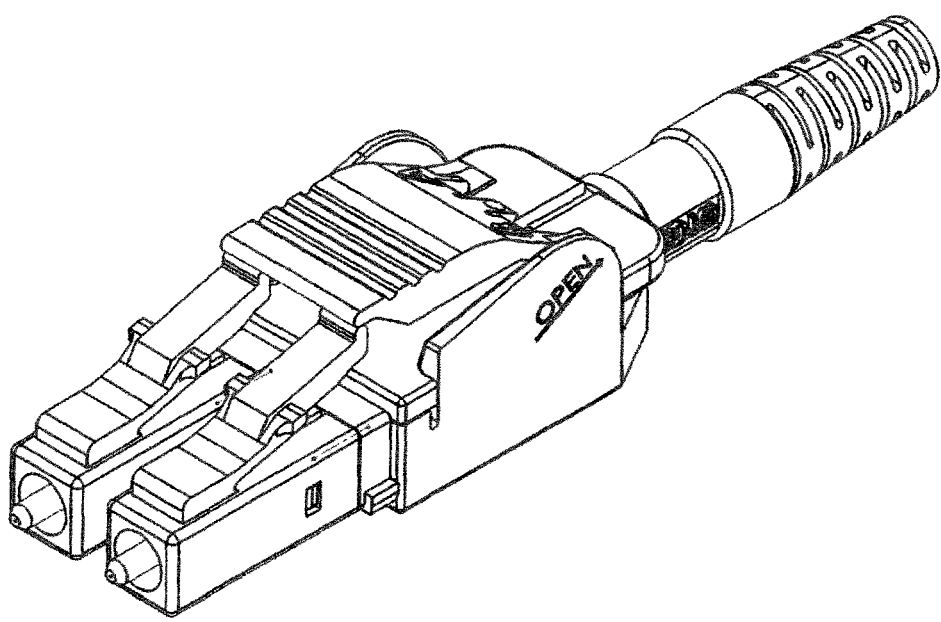
FIG. 19A depicts a perspective view of a connector assembly with a 6.25 mm pitch.
Figure 19B:
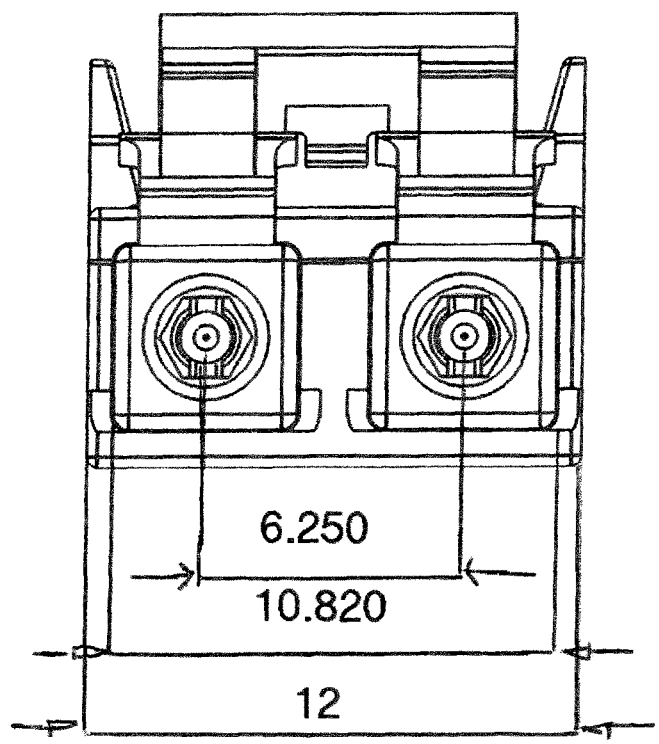
FIG. 19B depicts a front view of a connector assembly with a 6.25 mm pitch.

Referring now to FIGS. 19A and 19B, a connector is shown according to an embodiment. In some embodiments, such as that shown in FIGS. 19A and 19B, a connector may have a ferrule to ferrule pitch of 6.25 mm. In a further embodiment, the outer dimensions of the ferrule housing may be 10.82 mm, and the overall width dimension of the connector may be 12 mm.

Figure 20A:
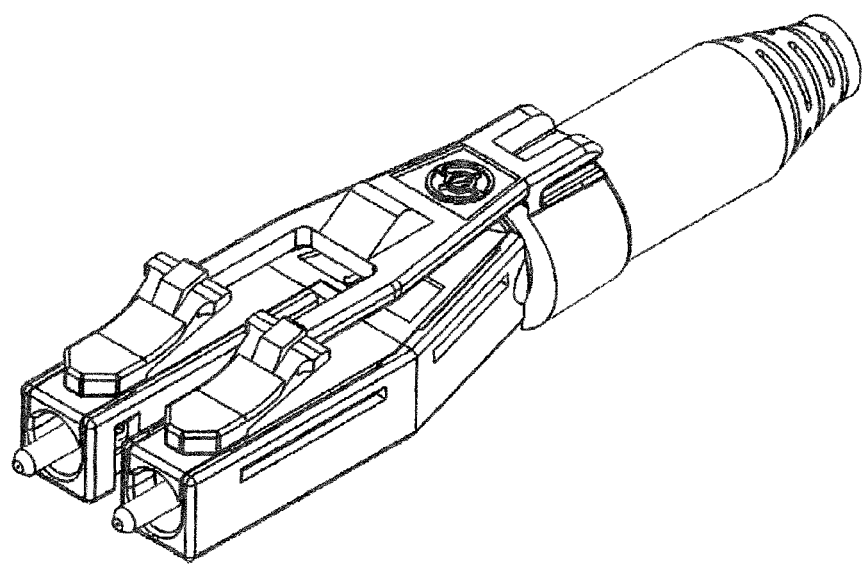
FIG. 20A depicts a perspective view of a connector assembly with a 6.25 mm pitch.
Figure 20B:
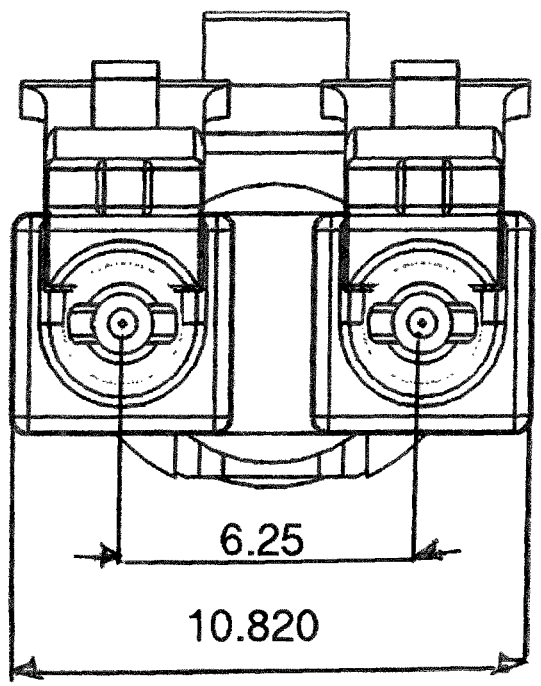
FIG. 20B depicts a front view of a connector assembly with a 6.25 mm pitch.

In an alternative embodiment, such as that shown in FIGS. 20A and 20B, some embodiments may keep the 6.25 mm pitch between the ferrules, and even the 10.82 dimensions of the ferrule housing components, in order to remain within existing standards. However, the overall width dimension of the connector may be reduced to the existing dimension of the ferrule housing (e.g., 10.82 mm) instead of the 12 mm of FIGS. 19A and 19B.

Figure 21A:
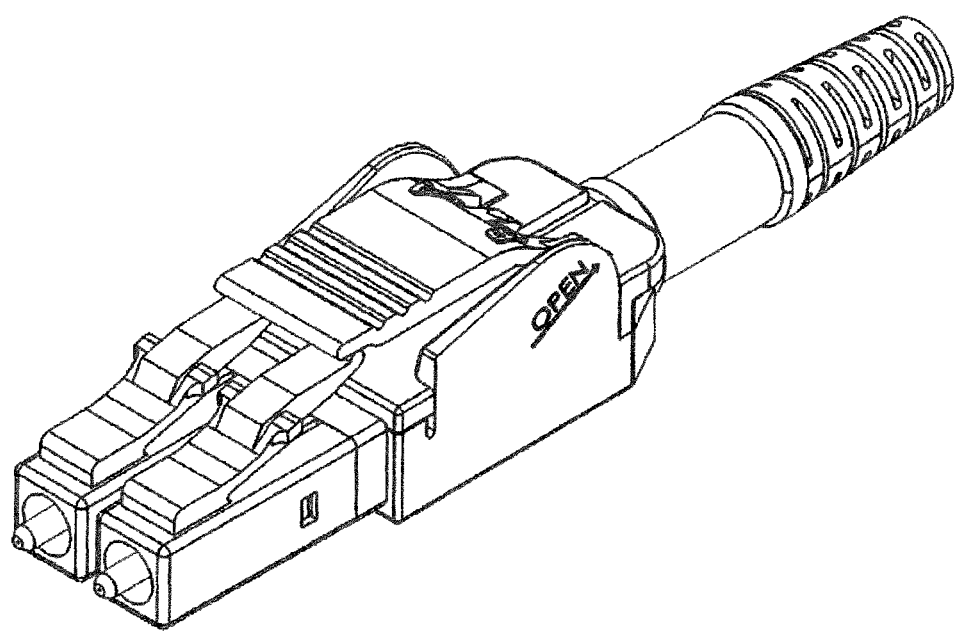
FIG. 21A depicts a perspective view of a connector assembly with a 5.25 mm pitch.
Figure 21B:
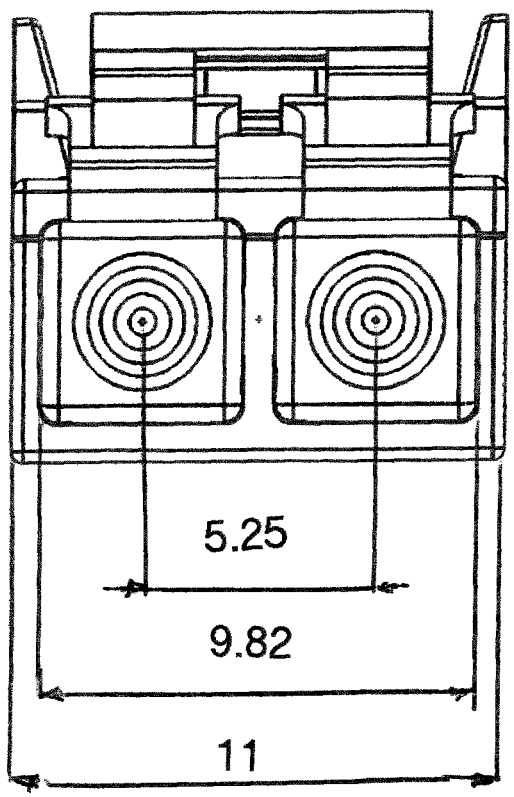
FIG. 21B depicts a front view of a connector assembly with a 5.25 mm pitch.

Referring now to FIGS. 21A and 21B, a connector is shown according to an embodiment. In some embodiments, such as that shown in FIGS. 21A and 21B, a connector may have a ferrule to ferrule pitch of 5.25 mm (i.e., 1 mm smaller than that of FIGS. 19A, 19B, 20A, and 20B). In a further embodiment, the outer dimensions of the ferrule housing may be 9.82 mm, and the overall width dimension of the connector may be 11 mm.

Figure 22A:
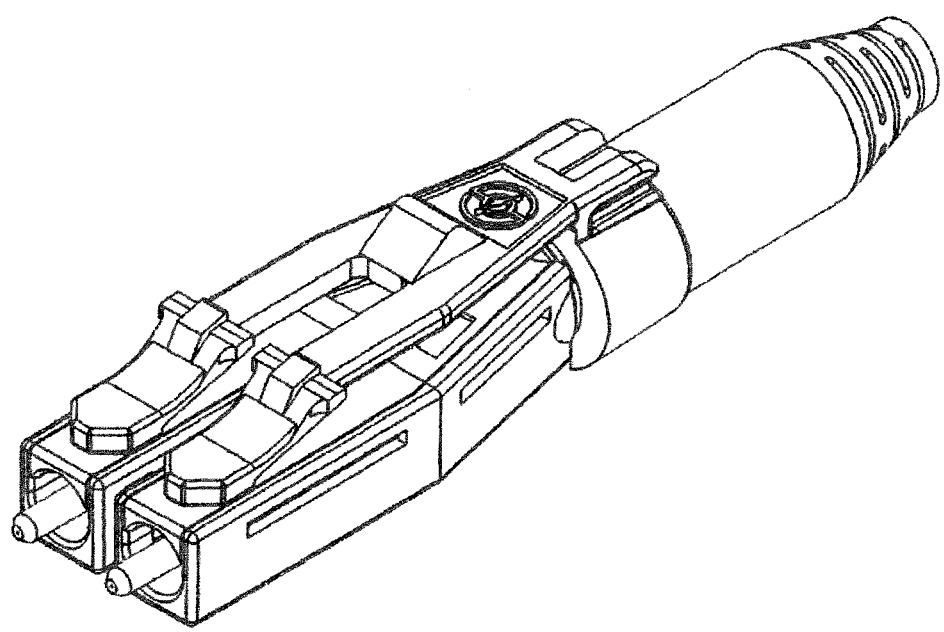
FIG. 22A depicts a perspective view of a connector assembly with a 5.25 mm pitch.
Figure 22B:
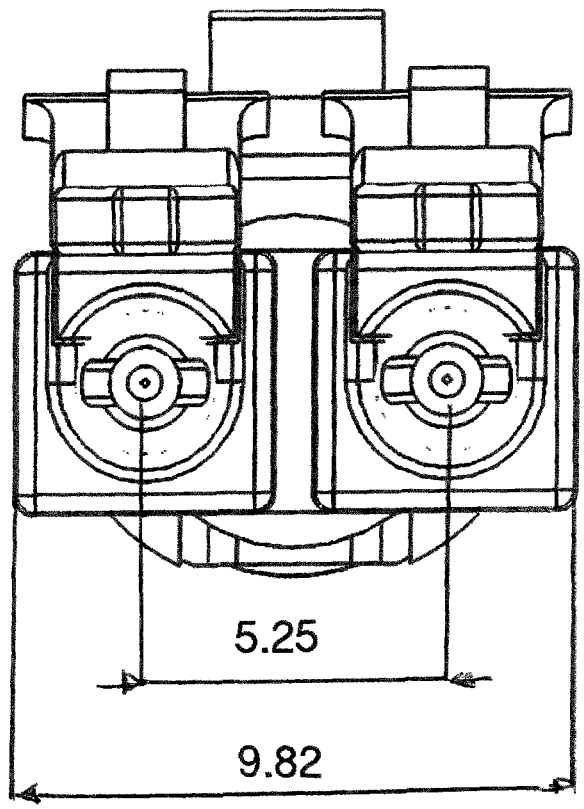
FIG. 22B depicts a front view of a connector assembly with a 5.25 mm pitch.

In an alternative embodiment, such as that shown in FIGS. 22A and 22B, some embodiments may keep the 5.25 mm pitch between the ferrules, and even the 9.82 dimensions of the ferrule housing components, in order to remain within existing standards. However, the overall width dimension of the connector may be reduced to the existing dimension of the ferrule housing (e.g., 9.82 mm) instead of the 11 mm of FIGS. 21A and 21B.

Figure 23A:
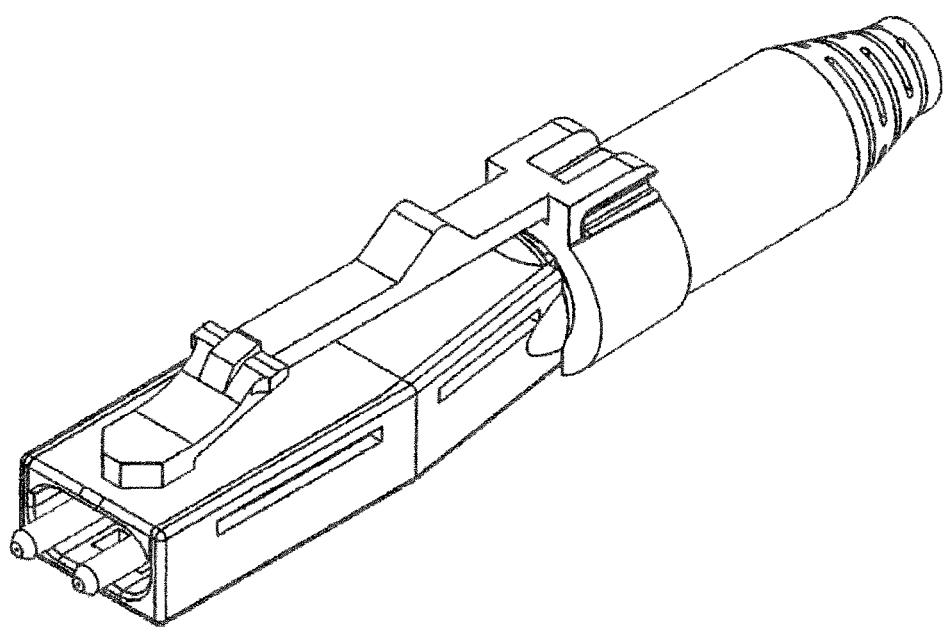
FIG. 23A depicts a perspective view of a connector assembly with a 3.4 mm pitch.
Figure 23B:
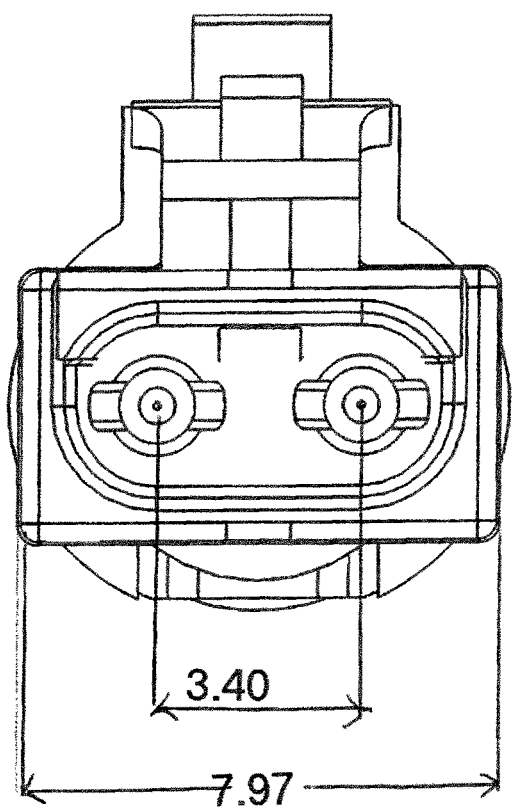
FIG. 23B depicts a front view of a connector assembly with a 3.4 mm pitch.

Referring now to FIGS. 23A and 23B, a connector is shown according to an embodiment. In some embodiments, such as that shown in FIGS. 23A and 23B, a miniature footprint connector may have a ferrule to ferrule pitch of 3.4 mm. In a further embodiment, the outer dimensions of the ferrule housing may be 7.97 mm.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A connector assembly comprising:
   a housing configured to accept a first ferrule and a second ferrule;
   a latch component that is removably connected to the housing, wherein the latch component is configured to rotate around the housing while the latch component is connected to the housing;
   the latch component comprising a first locking element configured to engage a second locking element to prevent rotation of the latch component in at least one of a first polarity position to a second polarity position;
   a push-pull tab removably connected to the housing and configured to move along the housing when a biasing force is applied in at least one of a forward direction and a rearward direction;
   wherein the push-pull tab is configured to compress the latch component when moving along the housing;
   wherein the latch component comprises a top with at least one protrusion; and
   further wherein the push-pull tab comprises at least one window; and further wherein the at least one protrusion extends through the at least one window when the push-pull tab is removably connected to the housing; and
   wherein the latch component is compressed when the push-pull tab moves along the housing causing an edge of the at least one window to impact the at least one protrusion.

2. The connector assembly of claim 1, wherein the push-pull tab further comprises a bottom portion having an inverted ramp; and
   wherein the latch component is compressed when the push-pull tab moves along the housing causing at least one of:

an edge of the at least one window to impact the at least one protrusion; and a portion of the inverted ramp to impact a portion of the latch component.

3. The connector assembly of claim 1, wherein the push-pull tab further comprises a bottom portion having an inverted ramp; and wherein the latch component is compressed when the push-pull tab moves along the housing causing a portion of the inverted ramp to impact a portion of the latch component.

4. The connector assembly of claim 1, wherein the push-pull tab comprises an underside having small protrusion;

wherein the housing comprises a top having a small recess;

wherein the small protrusion fits within the small recess when the push-pull tab is removably connected to the housing; and wherein the small protrusion limits a movement distance of the push-pull tab based on the size of the small recess.

5. The connector assembly of claim 1, wherein the push-pull tab comprises a tension member; and wherein the tension member applies a biasing force against a portion of the housing.

6. The connector assembly of claim 1, further comprising:
a pitch between the first ferrule and the second ferrule of 6.25 mm; and
an overall width of 10.82 mm.

7. The connector assembly of claim 1, further comprising:
a pitch between the first ferrule and the second ferrule of 5.25 mm; and
an overall width of 9.82 mm.

8. The connector assembly of claim 1, further comprising:
a pitch between the first ferrule and the second ferrule of 3.40 mm; and
an overall width of 7.97 mm.

9. A connector assembly having an adjustable polarity comprising:
a polymer uni-body base frame comprising a plug frame portion, a body portion, and a back post portion;
a crimp ring crimped onto the back post portion of the polymer uni-body base frame;
a top cover; and
an independent latch component;
wherein the independent latch component is removable connected to a distal end (D) of the polymer uni-body base frame; and
wherein the independent latch component is configured to rotate substantially concentric about the polymer uni-body base frame while the latch component is connected to the polymer uni-body base frame to change polarity of the connector assembly from a first polarity to a second polarity.

10. The connector assembly of claim 9, further comprising a push-pull tab having at least one window, wherein the independent latch component comprises a top with at least one protrusion.

11. The connector assembly of claim 10, wherein the at least one protrusion extends through the at least one window when the push-pull tab is removably connected to the polymer uni-body base frame; and wherein the independent latch component is compressed when the push-pull tab moves along the polymer uni-body base frame causing an edge of the at least one window to impact the at least one protrusion.

12. The connector assembly of claim 10, wherein the push-pull tab further comprises a bottom portion having an inverted ramp; and wherein the independent latch component is compressed when the push-pull tab moves along the polymer uni-body base frame causing at least one of:

an edge of the at least one window to impact the at least one protrusion; and a portion of the inverted ramp to impact a portion of the independent latch component.

13. The connector assembly of claim 10, further comprising a push-pull tab having a bottom portion having an inverted ramp, wherein the independent latch component is compressed when the push-pull tab moves along the polymer uni-body base frame causing a portion of the inverted ramp to impact a portion of the independent latch component.

14. The connector assembly of claim 10, further comprising a push-pull tab having an underside having a small protrusion;

wherein the polymer uni-body base frame comprises a top having a small recess;

wherein the small protrusion fits within the small recess when the push-pull tab is removably connected to the polymer uni-body base frame; and wherein the small protrusion limits a movement distance of the push-pull tab based on the size of the small recess.

15. The connector assembly of claim 10, further comprising a push-pull tab having a tension member, wherein the tension member applies a biasing force against a portion of the polymer uni-body base frame.

16. The connector assembly of claim 10, further comprising a first ferrule and a second ferrule supported by the polymer uni-body base frame:
a pitch between the first ferrule and the second ferrule of 6.25 mm; and
an overall width of 10.82 mm.

17. The connector assembly of claim 10, further comprising a first ferrule and a second ferrule supported by the polymer uni-body base frame:
a pitch between the first ferrule and the second ferrule of 5.25 mm; and
an overall width of 9.82 mm.

18. The connector assembly of claim 10, further comprising a first ferrule and a second ferrule supported by the polymer uni-body base frame:
a pitch between the first ferrule and the second ferrule of 3.40 mm; and
an overall width of 7.97 mm.

* * * * *